US010362061B2

United States Patent
Schwartz et al.

(10) Patent No.: US 10,362,061 B2
(45) Date of Patent: Jul. 23, 2019

(54) NETWORK ROUTING AND SECURITY WITHIN A MOBILE RADIO NETWORK

(71) Applicant: JPU.IO LTD, Petach Tikva (IL)

(72) Inventors: Jonathan Schwartz, Petach Tikva (IL); Franck Malka, Petach Tikva (IL)

(73) Assignee: JPU.IO LTD, Petach Tikva (IL)

( * ) Notice: Subject to any disclaimer, the term of this patent is extended or adjusted under 35 U.S.C. 154(b) by 200 days.

(21) Appl. No.: 15/090,918

(22) Filed: Apr. 5, 2016

(65) Prior Publication Data

US 2017/0163685 A1 Jun. 8, 2017

Related U.S. Application Data

(60) Provisional application No. 62/264,791, filed on Dec. 8, 2015.

(51) Int. Cl.
*H04L 29/06* (2006.01)
*H04W 12/08* (2009.01)
*H04L 29/12* (2006.01)
*H04W 88/16* (2009.01)

(52) U.S. Cl.
CPC .......... *H04L 63/20* (2013.01); *H04L 63/0227* (2013.01); *H04L 63/0272* (2013.01); *H04L 63/104* (2013.01); *H04W 12/08* (2013.01); *H04L 61/1511* (2013.01); *H04L 61/2007* (2013.01); *H04L 61/2503* (2013.01); *H04W 88/16* (2013.01)

(58) Field of Classification Search
None
See application file for complete search history.

(56) References Cited

U.S. PATENT DOCUMENTS

| 9,473,986 | B2 * | 10/2016 | Tomici | H04L 45/123 |
| 9,781,645 | B2 * | 10/2017 | Singh | H04W 36/18 |
| 2004/0001475 | A1 * | 1/2004 | Mikkonen | H04L 12/4641 |
| | | | | 370/351 |

(Continued)

FOREIGN PATENT DOCUMENTS

WO 2017098320 6/2017

OTHER PUBLICATIONS

"International Application Serial No. PCT/IB2018/001827, Written Opinion dated May 8, 2017", 5 pgs.

(Continued)

*Primary Examiner* — Trang T Doan
(74) *Attorney, Agent, or Firm* — Schwegman Lundberg & Woessner, P.A.

(57) ABSTRACT

In an example embodiment, A PICNEEC is provided. It includes one or more Virtual Customized Rules Enforcer (VCRE) instances, each VCRE instance corresponding to a group of mobile devices and defining a set of policies personalized for the group of mobile devices. Each VCRE is configured to, upon receiving a data packet communicated between a packet-based network and a mobile device in the corresponding group via a radio network, execute one or more policy rules stored in the VCRE instance to the data packet prior to forwarding the data packet. Each VCRE instance is controlled independently of one another via direct accessing of the VCRE instance by a different customer of the mobile network provider.

35 Claims, 19 Drawing Sheets

(56) References Cited

U.S. PATENT DOCUMENTS

| | | | |
|---|---|---|---|
| 2006/0161816 A1* | 7/2006 | Gula | H04L 41/065 |
| | | | 714/39 |
| 2006/0259963 A1* | 11/2006 | Maxwell | H04L 12/4675 |
| | | | 726/15 |
| 2007/0097991 A1* | 5/2007 | Tatman | H04L 12/4641 |
| | | | 370/395.53 |
| 2008/0198861 A1* | 8/2008 | Makela | H04W 12/06 |
| | | | 370/401 |
| 2010/0058436 A1 | 3/2010 | Maes | |
| 2011/0099604 A1 | 4/2011 | Zhou et al. | |
| 2012/0166618 A1* | 6/2012 | Dahod | H04L 12/66 |
| | | | 709/224 |
| 2012/0233668 A1* | 9/2012 | Leafe | G06F 9/44526 |
| | | | 726/4 |
| 2014/0007222 A1* | 1/2014 | Qureshi | G06F 21/10 |
| | | | 726/16 |
| 2015/0356498 A1* | 12/2015 | Casanova | G06Q 10/087 |
| | | | 705/13 |
| 2016/0277980 A1* | 9/2016 | Roeland | H04W 28/0252 |
| 2016/0330748 A1* | 11/2016 | Bindrim | H04L 65/1013 |
| 2016/0337189 A1* | 11/2016 | Liebhart | H04L 45/306 |
| 2017/0149665 A1* | 5/2017 | Yousaf | H04L 47/115 |
| 2017/0201922 A1* | 7/2017 | Akiyoshi | H04W 4/70 |

OTHER PUBLICATIONS

"International Application Serial No. PCT/IB2018/001827, International Search Report dated May 8, 2017", 2 pgs.
"International Application Serial No. PCT/IB2016/001827, International Preliminary Report on Patentability dated Jan. 29, 2018", 13 pgs.

* cited by examiner

Add a new service port to Name — 900

Name — 902

Description — 904

Service type — Custom — 906

Protocol — Custom — 908 — 914

Port Number — 910 — Range — 912

Port behavior — Open for all IPs / Limited

Cancel

*FIG. 9*

NETWORK ROUTING AND SECURITY WITHIN A MOBILE RADIO NETWORK

PRIORITY

This application claims priority to U.S. Provisional Patent Application Ser. No. 62/264,791, filed Dec. 8, 2015, which application is incorporated by reference herein its entirety.

TECHNICAL FIELD

The present disclosure generally relates to mobile radio networking. More specifically, the present disclosure describes a technique for network routing and security within a mobile radio network.

BACKGROUND

Mobile networks allow devices to connect to external packet switched networks (such as the Internet) as part of the basic service provided within the network as defined by international standard bodies. Example of such international standard bodies include 3rd Generation Partnership Project (3GPP) for Global System for Mobile Communications (GSM)/Universal Mobile Telecommunication System (UMTS)/Long-Term Evolution (LTE) domains, Time Division Multiple Access (TDMA)/Code Division Multiple Access (CDMA)/CDMA2000 networks, and newer network design initiatives such as LoRa and SIGFOX.

In such systems, the packet data coming to and from a mobile device is transmitted via the radio network to elements such as a Base Transceiver Station (BTS) in a 2G network, a NodeB in a 3G network or an eNodeB in a 4G network. Thereafter, the packet data is sent using tunnels towards a Serving General Packet Radio Service (GPRS) Support Node (SGSN) in a 2G/3G network or the Serving Gateway (SGW) in a 4G network or similar device in other mobile network solutions.

GPRS Tunnelling Protocol (GTP) tunnels from all mobile devices are aggregated towards a Gateway GPRS Support Node (GGSN) in a 2G/3G network or the PDN Gateway (PGW) in a 4G network or similar device in other mobile network solutions. These devices then merge many Ethernet connections containing numerous tunnels in each connection.

It is then the responsibility of the GGSN or PGW to disperse the aggregated GTP tunnels traffic into multiple data streams and route every single stream into its designated destination on the external packet switched network as initially designated by the mobile device.

The 3GPP standards also define that each mobile device will define a routing context with whom it connects to the proper GGSN or PGW, called the Access Point Name (APN). 3GPP standards allow for each APN to have its own routing and security policy within the GGSN or PGW along with the ability to route the packet data through a firewall using a specific rule set.

However, such APN customized rule sets are defined by the mobile network operator personnel as he or she has the only access to the router equipment (e.g. GGSN or PGW).

In contrast, outside of the mobile network context, individuals or organizations are able to deploy their own routing and firewall equipment and maintain full control over the network capabilities of their devices. This capability is today deprived from any individual or organization which wants to define its own routing and security policies over its mobile devices, as this policy can only be defined by the mobile network operator.

BRIEF DESCRIPTION OF DRAWINGS

Some embodiments are illustrated by way of example and not limitation in the figures of the accompanying drawings, in which:

FIG. 9 is a screen capture illustrating a user interface in accordance with another example embodiment.

DETAILED DESCRIPTION

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques have not been shown in detail.

In an example embodiment, a routing system within a mobile network is provided that allows an individual or an organization to define routing and/or security policies for one or more mobile devices without the intervention of a mobile network operator.

Figure 1:
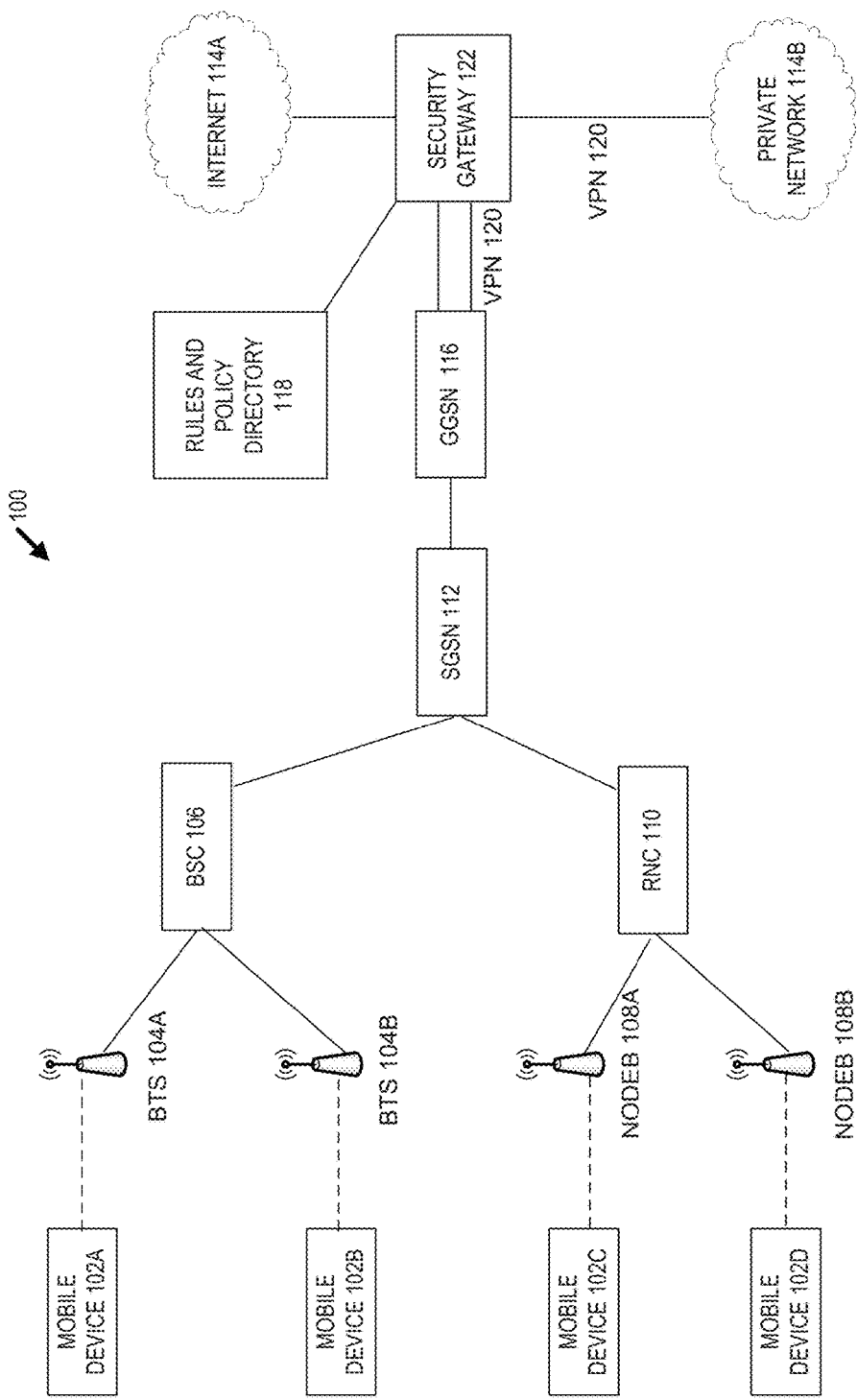
FIG. 1 is a block diagram illustrating a system, in accordance with an example embodiment, for routing mobile network communications.

FIG. 1 is a block diagram illustrating a system 100, in accordance with an example embodiment, for routing network communications in a GSM (2G) and/or UMTS (3G) mobile networks. The system 100 includes one or more mobile devices 102A-102D. Each mobile device 102A-102D may be any type of device having a radio communicator, commonly known as a cell transceiver. The mobile devices 102A-102D include, for example, smartphones, tablet computers, connected automobiles, sensors, alarm systems, etc.

Each mobile device 102A-102D connects to a mobile network via radio communications. In FIG. 1, two separate example types of mobile networks are depicted. The first is a GSM-based mobile network. In GSM-based mobile networks, mobile devices 102A, 102B connect via radio communication with a base transceiver station (BTS) 104A, 104B. The BTSs 104A, 104B are terminating nodes for the radio interface. Each BTS 104A, 104B includes one or more transceivers and is responsible for ciphering of the radio interface.

Each BTS 104 is then in communication with a base station controller (BSC) 106. Typically, a BSC 106 has hundreds of BTSs 104A, 104B under its control. The BSC 106 acts to allocate radio resources to the mobile devices 102A, 102B, administer frequencies, and control handovers between BTSs. The BSC 106 can also act as a concentrator, so that many low capacity connections to the BSC 106 become reduced to a smaller number of connections.

The second type of mobile network depicted here is a Universal Mobile Telecommunications System UMTS-based mobile network. A UMTS-based mobile network uses wideband code division multiple access (W-CDMA) radio access technology. Here, mobile devices 102C-102D connect via radio communication with a NodeB 108A, 108B. The NodeBs 108A, 108B are terminating nodes for the radio interface. Each NodeB 108A, 108B includes one or more transceivers and is responsible for ciphering of the radio interface. Each NodeB 108A-108B is configured to apply codes to describe channels in a CDMA-based UMTS network. Generally, each NodeB 108A-108B performs similar functions for the UMTS network that the BTS 104A-104B performs for the GSM network.

Each NodeB 108A-108B is then in communication with a radio network controller (RNC) 110. Typically, an RNC 110 has hundreds of NodeBs 108A, 108B under its control. The RNC 110 acts to allocate radio resources to the mobile devices 102C, 102D, administer frequencies, and control handovers between NodeBs 108A-108B. The RNC 110 can also act as a concentrator, so that many low capacity connections to the RNC 110 become reduced to a smaller number of connections.

It should be noted that while two different mobile network types are depicted here, the concepts described in this disclosure will work in systems having only a single network type, as well as in systems having multiple network types, either in addition to or in lieu of the network types depicted in FIG. 1.

The BTSs 104A, 104B and/or the NodeBs 108A, 108B connect to a Serving GPRS Support Node (SGSN) 112, which handles all packet switched data within the network. There are actually two forms of GPRS Support Nodes (GSNs) in a typical system 100. Of relevance here is the first type: the SSGN, which is typically responsible for the delivery of data packets to and from the from BTSs 104A, 104B and NodeBs 108A, 108B within its geographical service area. Additional tasks may include packet routing and transfer, mobility management (attaching/detaching and mobility management), logical link management, and charging functions.

In some example embodiments, the functions described above with respect to an SGSN 112 are performed by a serving gateway (SGW), which for simplicity is not depicted here. In some other example embodiments, some other type of device may perform the functions described above with respect to the SGSN 112. All of these types of devices, including SGSNs 112 and SGWs, may be collectively termed "aggregators" or "packet aggregators."

Data packets are sent upstream from a mobile device 102A-102D towards an external packet switched data network such as the Internet 114A or a private network 114B. The SGSN 112 aggregates the data packets from the mobile devices 102A-102D and sends them to a gateway GPRS support node (GGSN) 116, which is the second type of GSN. The GGSN 116 is responsible for the internetworking between the GPRS network and the external packet switched networks 114A, 114B. From an external network's point of view, the GGSN 116 is a router to a sub-network, because the GGSN 116 hides the GPRS infrastructure from the external network. When the GGSN 116 receives data addressed to a specific user, it checks if the user is active. If it is, the GGSN 116 forwards the data to the SGSN 112 serving the mobile user. If the mobile user is inactive, the data is discarded. The GGSN 116 is the anchor point that enables the mobility of the user terminal in the GPRS network.

The GGSN 116 looks up, for each individual data stream, the mobile device 102 for which the data stream is relevant in a rules and policy directory 118. The rules and policy directory 118 contains rules for routing and/or security. For example, the rules and policy directory 118 may indicate that a particular mobile 102 device should have data traffic routing in a particular network direction, or that a particular security protocol (e.g., IPSec) should be used for data traffic to and/or from that mobile device 102. The GGSN 116 then acts to implement whatever routing policies apply to the data traffic.

Traffic may be, for example, directed towards the private network 114B via a Virtual Private Network (VPN) 120. The VPN 120 is defined and controlled using information in the rules and policy directory 118.

All traffic (with or without a VPN 120) is then routed through a security gateway 122, which acts to employ multiple network security mechanisms, such as a firewall, walled garden, blacklisted IPs, etc. The security gateway 122 uses information in the rules and policy directory 118 in establishing the security rules, which may be provisioned on a device-by-device (or group of device-by-group of device) basis.

Thus, based on the routing rules and security policies enforced, upstream data packets and sent towards their destination in an external packet switched network 114A, 114B.

Downstream packets are sent from the external packet switched network 114A, 114B through the security gateway 122, VPN 120, GGSN 116, and SGSN 112 all the way back to the corresponding mobile device 102A-102D.

The entity that controls the mobile device 102A-102D (such as an individual or organization) may configure the security gateway 122, VPN 120, and GGSN 116 by, for example, using an external console or other type of communication that allows manipulation, configuration, and monitoring of the network elements as if the individual or organization controls such elements in the internal network.

Typically, mobile devices 102 are onboarded onto a mobile network by configuring an Access Point Name (APN) for the mobile device 102. Each mobile device 102 has a unique APN assigned to it. In an example embodiment, the system 100 does not have to utilize APN information in order to provide routing or security policies for data traffic to or from a mobile device 102. Each group of devices gets assigned its own "router/firewall" instance where a customer can define his or her own settings including, for example, selection of predefined security profiles (e.g., connected car, sensor), defining of walled gardens, establishments of VPN access, definition of firewall rules, and IP address allocations based on Internet Mobile Subscriber Identity (IMSI).

Figure 2:
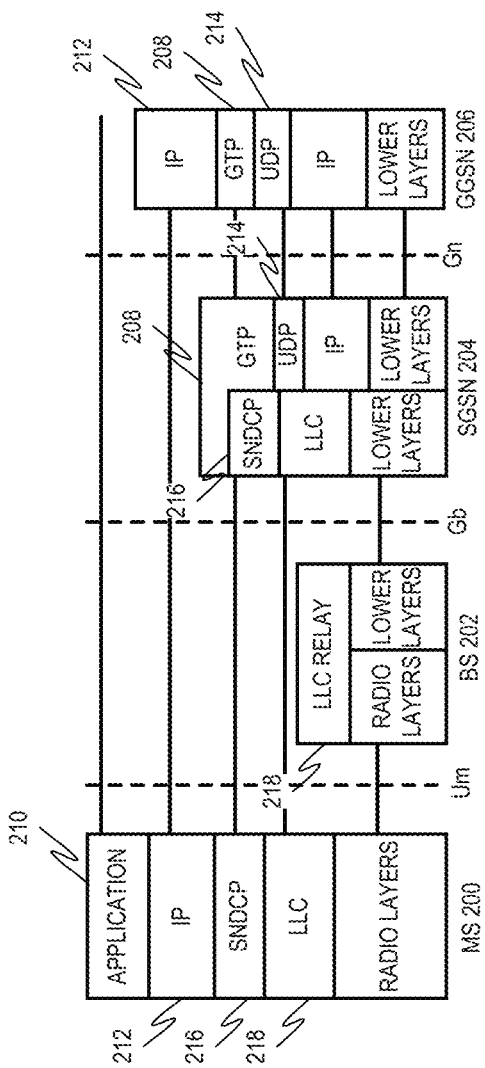
FIG. 2 is a block diagram illustrating protocol stacks for GPRS sub-network services, in accordance with an example embodiment.

FIG. 2 is a block diagram illustrating protocol stacks for GPRS sub-network services, in accordance with an example embodiment. Depicted here are a mobile device (MS) 200, base station (BS) 202, SGSN 204, and GGSN 206. GTP 208 is the protocol used between the SGSN 204 and GGSN 206 using the Gn interface. This is a layer 3 tunnelling protocol. The process that takes place appears like a normal IP sub-network for users inside and outside the network. An application 210 communicates via IP 212, which is carried through the GPRS network and out through the GGSN 206. The packets that are moving between the GGSN 206 and the SGSN 204 use GTP 208. This way the IP addresses located on the external side of the GPRS do not have to deal with the internal backbone. On the SGSN 204, UDP 214 and IP 212 are run by GTP 208.

SubNetwork Dependent Convergence Protocol (SNDCP) 216 and Logical Link Control (LLC) 218 are used in combination between the SGSN 204 and the MS 200. SNDCP is the top-most layer of the user plane GPRS protocol stack. The SNDCP 216 flattens data to reduce the load on the radio channel. The main purpose of SNDCP 216 is to buffer and segment network protocol data unit (PDUs), add headers to each segment, and then give the segment to LLC 218 for transmission. A safe logical link created by encrypting packets is provided by LLC 218 and the same LLC 218 link is used as long as a mobile is under a single SGSN 204. SNDCP 216 also performs compression and decompression. The idea is to reduce the amount of data that is required to be sent over the aid. As such, SNDCP 216 is often aware of certain details about the packet-data network (PDN) protocol for compression-related functions. The SNDCP 216 may also be aware of PDP contexts and corresponding information such as PDP type, QoS, etc. This information is given during a PDP context activation procedures.

The function of the LLC 218 is to manage and ensure the integrity of data transmissions. The LLC 218 provides data link layer links to services for the network layer protocols. This is accomplished by LLC service access points for the services residing on network computers. Additionally, there is an LLC control field for delivery requests or services. The LLC 218 may also perform ciphering and deciphering of packets.

Figure 3:
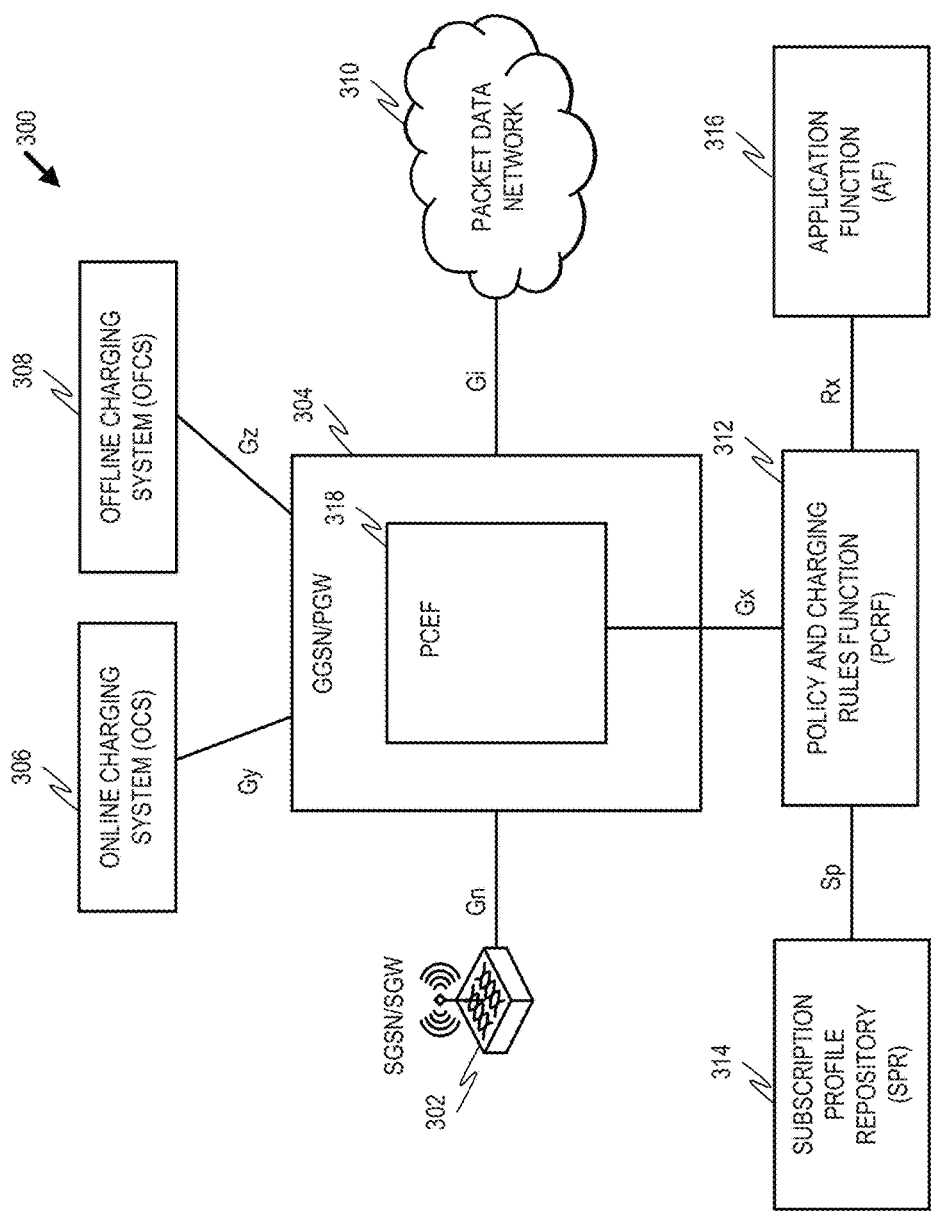
FIG. 3 is a block diagram illustrating a system including an SGSN/SGW and a GGSN/Packet Data Network (PDN) Gateway (PGW).

FIG. 3 is a block diagram illustrating a system 300 including an SGSN/SGW 302 and a GGSN/PDN Gateway (PGW) 304. In an example embodiment the SGSN/SGW 302 may be the SGSN 112 of FIG. 1 and the GGSN/PGW 304 may be the GGSN 116 of FIG. 1. The SGSN/SGW 302 transfers data from the mobile radio network to the GGSN/PGW 304 via a Gn interface port. The Gn is comprised of GPRS Tunnelling Protocol (GTP) tunnels. GTP is divided into GTP-C, which controls the tunnels, and GTP-U, which is the actual user traffic data.

An online charging system (OCS) 306 connects to the GGSN/PGW 304 via a Gy reference point. The OCS 306 is a billing system that tells the GGSN/PGW 304 if a certain tunnel has a quota on bandwidth, and also to allow or disallow tunnels based on the actual service plan and account balance per user. Online charging has two sub-functions: rating and unit determination. Both of them, can be implemented as centralized or decentralized.

Rating refers to calculation of piece out of the non-monetary units calculated by the unit determination function. Unit determination refers to the calculation of the number of non-monetary units (service units, data volume, time and events) that shall be assigned prior to starting service delivery.

Three cases for online charging can be distinguished: Immediate Event Charging (IEC), Event Charging with Unit Reservation (ECUR), and Session Charging with Unit Reservation (SCUR).

IEC involves a direct debit operation, where a financial account is immediately debited for an appropriate charge. In ECUR, the financial units are reserved prior to service delivery, and a financial account debit operation is carried out following the conclusion of service delivery. In SCUR, the financial units are reserved prior to session supervision, and a financial account debit operation is carried out following the conclusion of session termination.

An offline charging system (OFCS) 308 connects to the GGSN/PGW 304 via the Gz reference point. The OFCS 308 is a billing system for post-paid call detail record (CDR) processing. Offline charging is a process where charging information for network resource usage is collected concurrently with that resource usage. The charging information is then passed through a chain of logical charging functions. At the end of this process, CDR files are generated by the network, which are then transferred to the network operator's billing domain for the purpose of subscriber billing and/or interoperator accounting (or additional functions such as statistics). The billing domain typically includes post-processing systems such as the operator's billing system or billing mediation device.

Examples of offline charging functions include charging trigger function (CTF), charging data function (CDF), and charging gateway function (CGF). The CTF generates charging events based on the observation of network resource usage. The CTF is the focal point for collecting the information pertaining to chargeable events within the network element, assembling this information into matching charging events, and sending these charging events towards the CDF. The CTF is made up of two functional blocks: account metrics collection, which monitors signalling functions for calls service events or sessions established by the network users, or the handling of user traffic for those calls, service events or sessions, or service delivery to the user via these calls, service events or sessions, and accounting data forwarding, which receives the collected accounting metrics and determines the occurrence of chargeable events from a set of one or more of the metrics and then assembles charging events that match the detected chargeable events, and forwards the charging events towards the Charging Data Function via an Rf interface.

The CDF receives charging events from the CTF via the Rf reference point. It then uses the information contained in the charging events to construct CDRs. The CDRs produced by CDF are transferred immediately to the Charging Gateway Function (CGF) via the Ga interface point. The CGF performs functions such as CDR reception from the CDF via Ga interface in near real-time, CDR pre-processing, validation, consolidation and (re)formatting of CDRs, CDR error handling, persistent CDR storage, CDR routing and filtering, CDR file management, and CDR file transfer to the billing domain The packet data network 310 connects to the GGSN/PGW 304 via the Gi reference point. The packet data network 310 is a public or private data network to which mobile devices can send data. A policy and charging rules function (PCRF) 312 connects to the GGSN/PGW 304 via the Gx reference point is part of a method to enforce data flow policies in the GGSN/PGW 304. The PCRF 312 is in charge of collecting the rules and passing them to the GGSN/PGW 304. The PCRF 312 provides network control regarding service data flow detection, gating (blocking or allowing packets), QoS control, and low-based charging. The PCRF 312 may, for example, reject a request received from an application when the service information is not consistent with subscription information.

The PCRF 312 connects to a subscription profile repository (SPR) 314 via the Sp reference point. The SPR 314 contains subscriber and subscription information, typically stored on a per-PDN basis, and would include information such as the subscriber's allowed services, information on the subscriber's allowed QoS, the subscriber's charging related information, and a subscriber category. The PCRF 312 can access the SPR 314 to query profiles for each relevant user. An application function (AF) 316 connects to the PCRF 312 via the Rx reference point and allows external application logic to change PCRF rules.

The GGSN/PGW 304 uses a policy enforcement rules function (PCEF) 318 to enforce the rules made by the PCRF 312. While the GGSN/PGW 304 allows basic routing functionality as well as the establishment of VPN, network address translation (NAT), and basic firewall, all of these services are based on the network operator configuration, and none of this functionality is exported to be modified by the actual bearers of the service (mobile devices and their owners, as well as corporations or other organizations employing the owners, collectively known as customers). They are also directed towards connecting internal and external network elements and not specific packet traffic from the mobile devices. The PCRF 312 also enforces security rules using a blacklist (e.g., list of banned mobile devices, network locations, traffic types, etc.).

Figure 4:
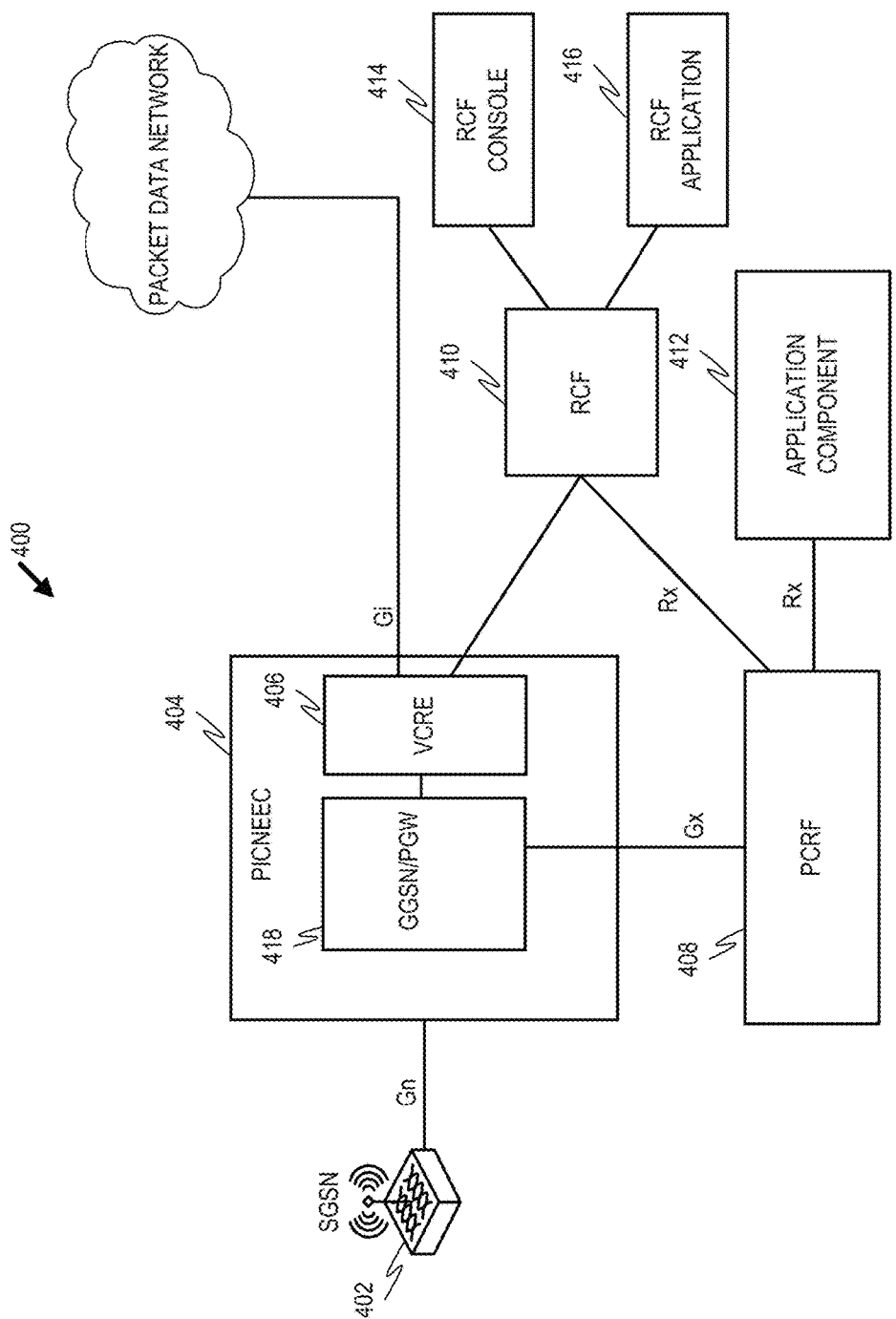
FIG. 4 is a block diagram illustrating a system, in accordance with an example embodiment, including an SGSN/SGW and a PDN Integrated Customized Network Edge Enabler and Controller (PICNEEC) including a GGSN/PGW.

In an example embodiment, the system 300 of FIG. 3 is modified to allow for additional functionality. This functionality may generally be named PDN Integrated Customized Network Edge Enabler and Controller (PICNEEC) of which a GGSN or PGW are just two example components. FIG. 4 is a block diagram illustrating a system 400 including an SGSN or SGW 402, and a PICNEEC 404. In an example embodiment the SGSN/SGW 402 may be the SGSN 112 of FIG. 1 and the GGSN/PGW 418 may be the GGSN 116 of FIG. 1. The SGSN/SGW 402 transfers data from the mobile radio network to the GGSN/PGW 418 via a Gn interface port. The PICNEEC 404 includes a Virtual Customized Rules Enforcer (VCRE) 406, which sits on the Gi reference point. It can either be internal to the PICNEEC 404 or as an add-on component to an existing PICNEEC 404. The VCRE 406 defines the routing, firewall, VPN, and security features for the system 400. A Policy and Charging Rules Component, such as a policy and charging rules function (PCRF) 408 executes general policy and charging rules in the GGSN/PGW 418.

A Rules Customizer Function (RCF) 410 is an external repository and control function that transfers all of the policy and security changes and configurations to the VCRE 406. The RCF 410 may also connect to the PVRF 408 using an Rx interface, as if it is an application component 412, such as an application function. A RCF console 414 is used by a customer to set the routing and security policies. The RCF console 414 may be, for example, a web portal, a Secure Shell (SSH) access, a Man-Machine Language (MML) interface, etc.

An RCF application 416 provides application program interface (API) access to the RCF 410, from, for example, an external application, application on a mobile device, etc.

The customer may use either the RCF console 414 or the RCF application 416 to define a VCRE and specify various rules, including, but not limited to, defining a VPN between the VCRE and an external network, defining network routing between the VCRE and IP connectivity networks, defining firewall rules for packet data traffic passing through the VCRE instance, defining NAT rules for packet data traffic passing through the VCRE instance, defining domain name system (DNS) settings for packet data traffic passing through the VCRE instance, defining security rules for packet data traffic passing through the VCRE instance, assigning IP addresses to mobile devices, and defining Hypertext Transfer Protocol (HTTP) Header Enrichment (HHE) rules for traffic passing through the VCRE instance.

HHE means that when the mobile device create an http request towards an HTTP server, the traffic passes through an HTTP proxy (usually the GGSN/PGW itself) which adds information to the HTTP headers that allow the HTTP server to identify where the request came from. Such info can include an MSISDN (the mobile device phone number) or an IMSI.

Figure 5:
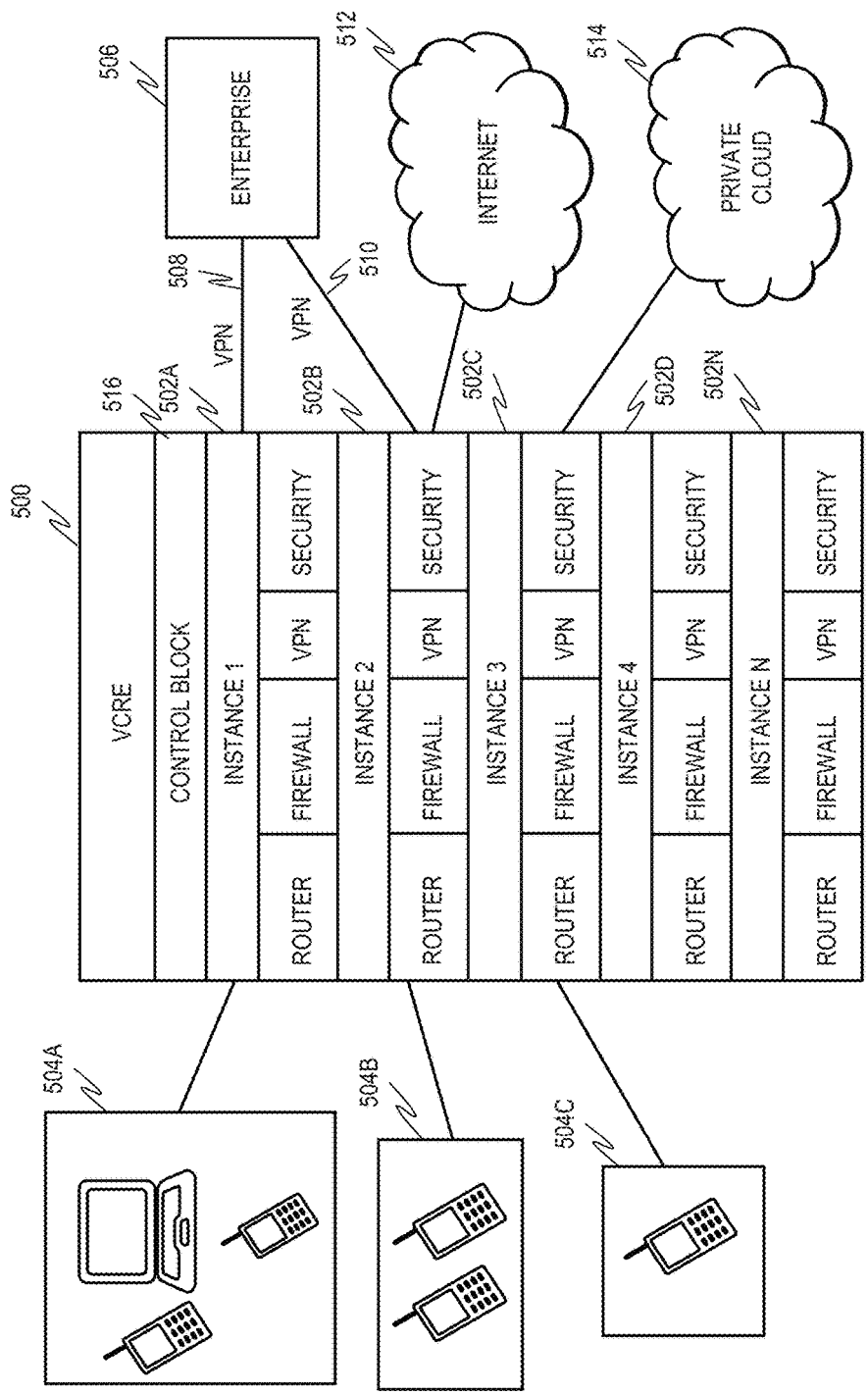
FIG. 5 is a block diagram illustrating a VCRE, in more detail, in accordance with an example embodiment.

FIG. 5 is a block diagram illustrating a VCRE 500, such as VCRE 406 of FIG. 4, in more detail, in accordance with an example embodiment. The VCRE 500 is divided into multiple virtual instances 502A-502N of a firewall/router/VPN/security enforcer. Each set of mobile devices or even a single mobile device is handled by a single VCRE instance 502A-502N. For each instance, multiple rules can be defined. For example, VCRE instance 502A corresponds to device group 504A, which contains three devices. VCRE instance 502A indicates that connections may only be established to an enterprise 506 via a VPN 508. VCRE instance 502B corresponds to device group 504B, which contains two devices. VCRE instance 502B indicates that connections may be made to the enterprise 506 via a VPN 510 or can connect to the Internet 512. VCRE instance 502C corresponds to device group 504C, which only contains a single device. VCRE instance 502C indicates that connections may be made to a private cloud 514, not by a VPN, but by a walled garden (where the IP addresses a device is allowed to access is limited).

The VCRE 500 may additionally include control block 516, which acts to perform functions that are involved generally among all the VCRE instances 502A-502N. These functions include, for example, establishment of the VCRE instances, allocation of specific mobile devices to VCRE instances 502A-502N, and deletion of VCRE instances 502A-502N. Additionally, as will be seen in more detail below, in the event that the VCRE 500 is external to a GGSN, the VCRE control block 516 informs the GGSN of the IP address for the mobile device and forwards all traffic from that IP address to the correct VCRE instance 502A-502N.

Each VCRE instance 502A-502N may contain a VCRE data structure storing the information it needs for the routing and security rules.

Each VCRE instance 502A-502N is controlled independently of one another via direct accessing of the VCRE instance 502A-502N by a different customer of the mobile network provider (the entity controlled the PICNEEC).

Figure 6:
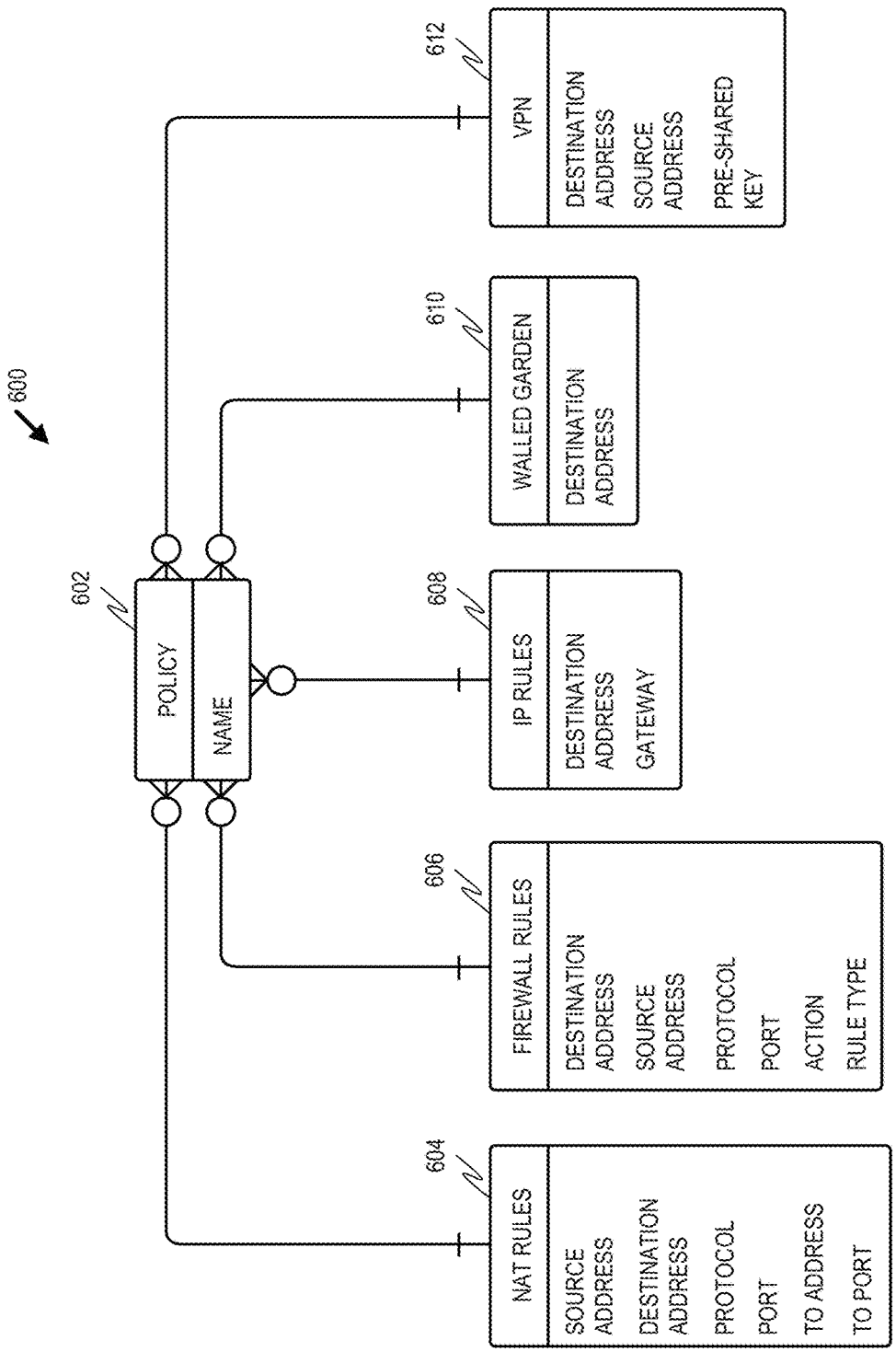
FIG. 6 is a diagram illustrating a PICNEEC policy data structure in accordance with an example embodiment.

FIG. 6 is a diagram illustrating the VCRE policy data structure 600 in accordance with an example embodiment. Each VCRE policy data structure 600 may include a policy component 602 with a name field where a name for the policy can be specified. Attached to this policy component 602 is a NAT rules component 604, a Firewall rules component 606, an IP rules component 608, a walled garden component 610, and a VPN component 612. It should be noted that not all VCRE data structures need to have all of these components 604-612. The customer can pick and choose which of these components 604-612 to include based on the needs of the policy. For example, if a particular policy uses a walled garden but no VPN, the walled garden component 610 may be included but the VPN component 612 excluded.

The NAT rules component 604 may contain fields such as source address, destination address, protocol, port, to address, and to port. The firewall rules component 606 may contain fields such as destination address, source address, protocol, port, and action. The IP rules component 608 may contain fields such as destination address and gateway. The walled garden component 610 may include fields such as destination address of permitted locations to access. The VPN component 612 may contain fields such as destination address, source address, and a pre shared key.

A policy component 602 may include additional sub components such as filter rules, routing rules, packet sniffer rules, deep packet inspection (DPI) rules, load balancing rules, and other components that are employed in modern IP based networks.

Figure 7:
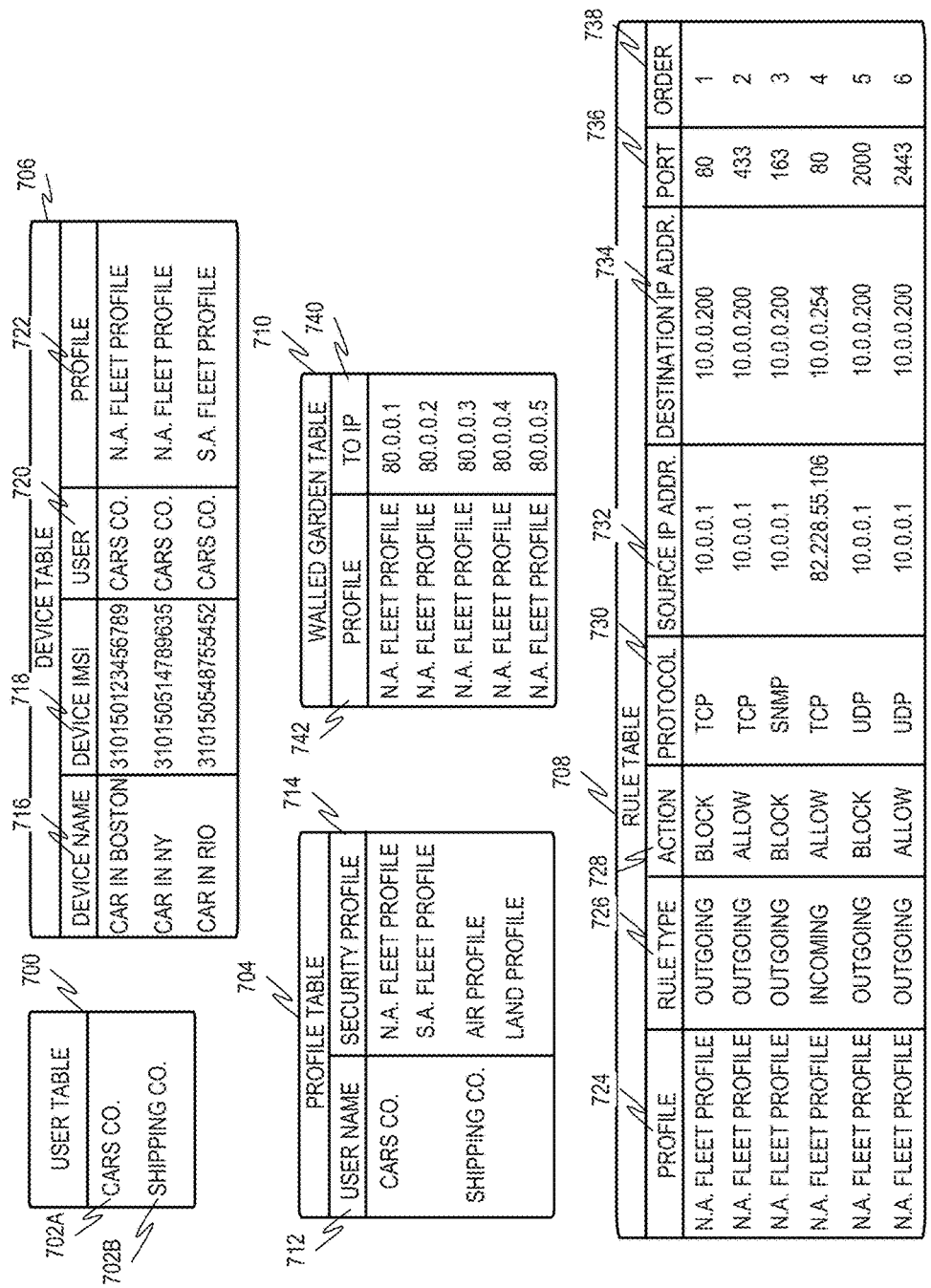
FIG. 7 is a diagram illustrating example tables in accordance with an example embodiment.

FIG. 7 is a diagram illustrating example tables in accordance with an example embodiment. A user table 700 may contain a list of user names 702A, 702B. The user names 702A, 702B may be utilized in the other tables 704-710. A profile table 704 contains a column for user names 712 and a column for corresponding profiles 714 associated with each user name 702A, 702B. Thus, here, for example, each user name 702A, 702B has two possible profiles. For example, Cars Co. 702A can have a profile of N.A. Fleet Profile (North American Fleet Profile) or S.A. Fleet Profile (South American Fleet Profile). A device table 706 contains an indication of an individual device name 716, the devices corresponding IMSI 718, the user name associated with the device 720, and the profile associated with the device 722. As can be seen, there may be multiple devices associated with each user, and each individual device may have a different profile.

A rule table 708 provides a series of rules associated with each security profile 724. For example, a rule type 726, action 728, protocol 730, Source IP Address 732, Destination IP Address 734, port 736, and order 738 may be defined for each rule. Of course, these are only examples of the various different types of rules that can be defined.

A walled garden table 710 provides a series of IP addresses 740 to which a corresponding profile 742 allows access, while forbidding all other addresses.

Figure 8:
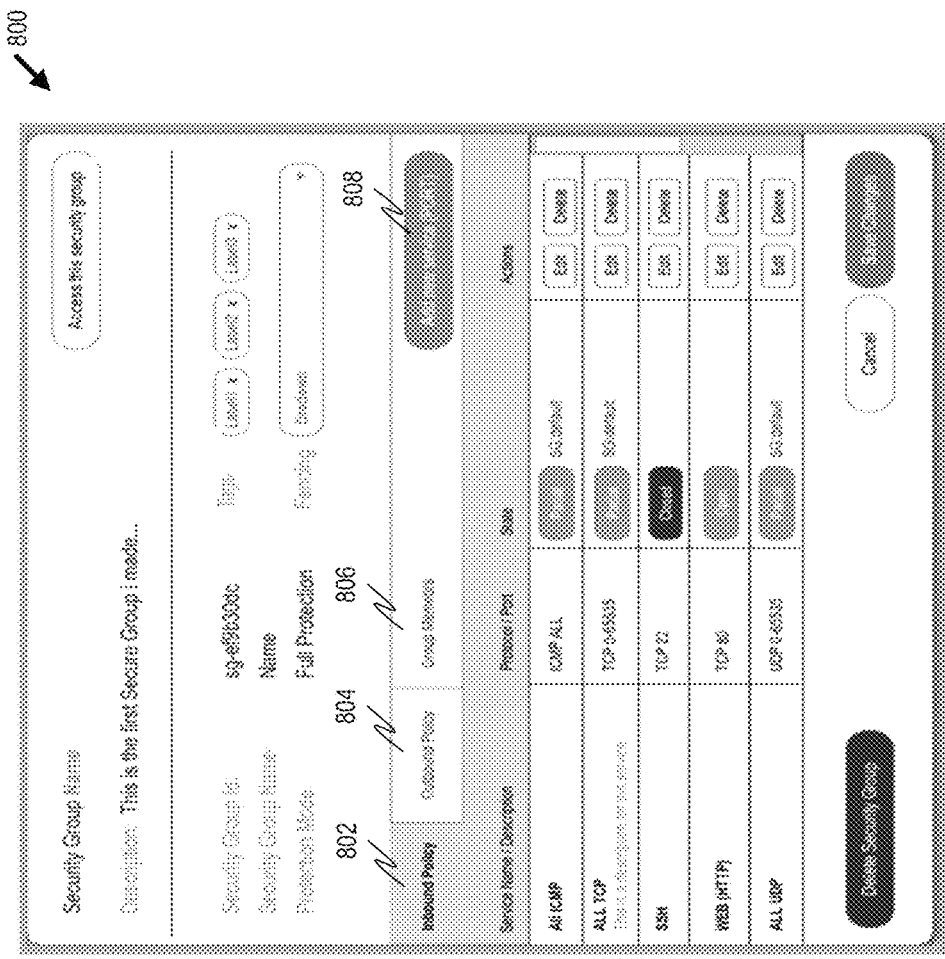
FIG. 8 is a screen capture illustrating a user interface in accordance with an example embodiment.

FIG. 8 is a screen capture illustrating a user interface 800 in accordance with an example embodiment. The user interface 800 may be provided as part of an RCF console 414 and/or RCF application 416, as described earlier. The user interface 800 permits a user, such as an administrator of an enterprise, to create one or more rules and associate those rules with security groups of devices. When selected, tab 802 allows the user to edit, delete, or add inbound communication policies (e.g., policies for communications being sent from a packet data network 512, 514 to a device). When selected, tab 804 allows the user to edit, delete, or add outbound communication policies (e.g., policies for communications being sent from a device to a packet data network 512, 514. When selected, tab 806 allows the user to add or delete group members (e.g., devices that are part of this security group). Additionally, button 808 allows the user to add a new service port.

FIG. 9 is a screen capture illustrating a user interface 900 in accordance with another example embodiment. The user interface 900 may be presented when the user selects button 808 of user interface 800 of FIG. 8. Here, the port can be assigned a name 902, description 904, service type 906, protocol 908, port number 910, range 912, and port behaviour 914.

Figure 10:
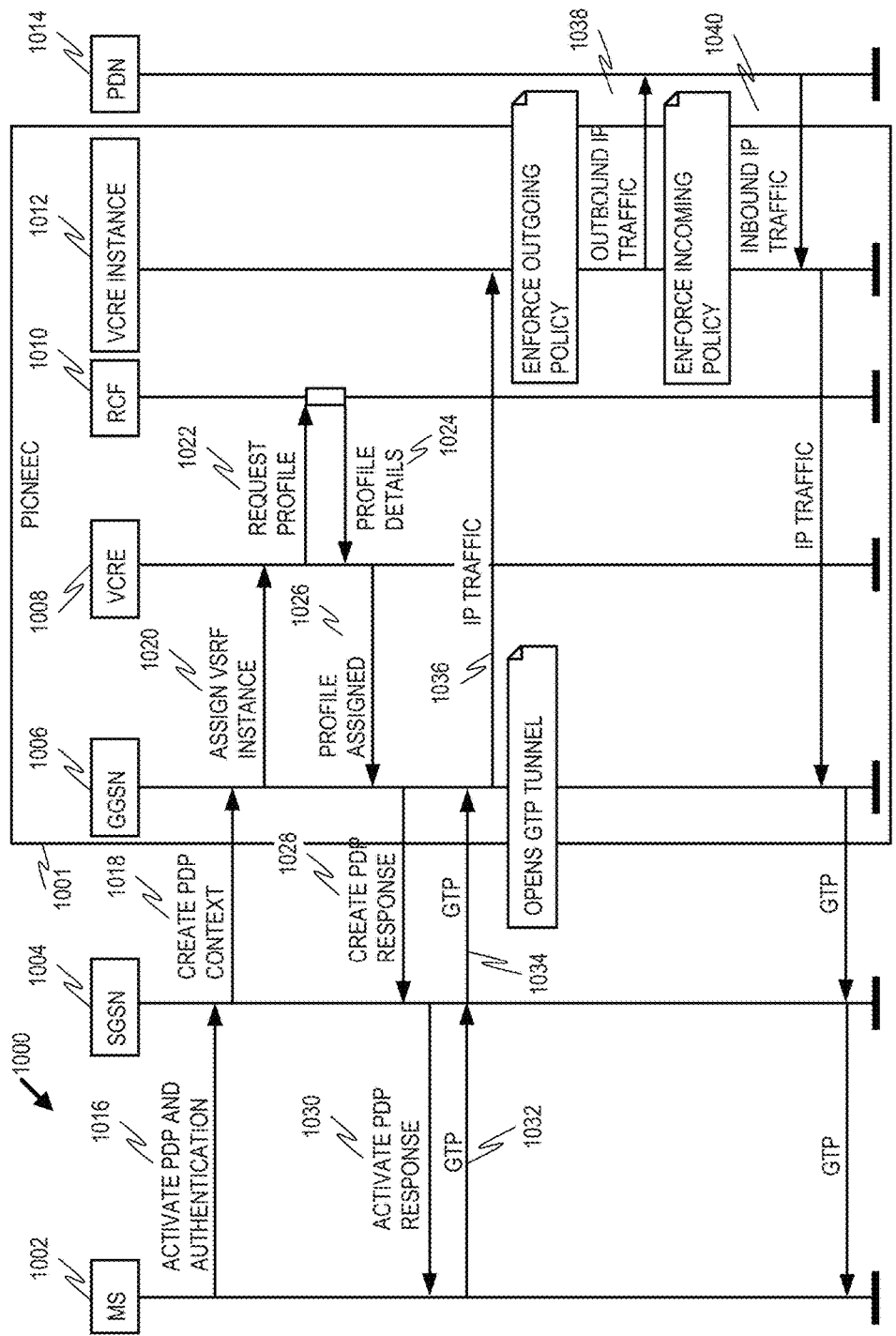
FIG. 10 is an interaction diagram illustrating a method, in accordance with an example embodiment, of establishing and handling data packets connection in a mobile network.

FIG. 10 is an interaction diagram illustrating a method 1000, in accordance with an example embodiment, of handling data packets in a mobile network. The method 1000 may utilize a mobile set (MS) 1002, an SGSN/SGW 1004, a PICNEEC 1001 with an internal GGSN/PGW 1006, a VCRE 1008, an RCF 1010, and a VCRE instance 1012 connecting to a packet data network (PDN) 1014. The MS 1002 may be the grouping of mobile devices that is the subject of the security and/or firewall rules described herein.

At operation 1016, the MS 1002 tries to register to the network and authenticate itself via the SGSN/SGW 1004. This is called creating a packet data protocol (PDP) context. The PDP context is a data structure that will be present on both the SGSN/SGW 1004 and the GGSN/PGW 1006 to contain the subscriber's session information when the subscriber has an active session. When a mobile device wishes to use a GPRS, it first attaches and then activates the PDP context. This allocates a PDP context data structure in the SGSN/SGW 1004 that the subscriber is currently visiting and the GGSN/PGW 1006 serving the subscriber's access point. Information captured may include the subscriber's IP address, the subscribers International Mobile Subscriber Identity (IMSI), and the tunnel endpoint IDs at the GGSN/PGW 1006 and/or SGSN/SGW 1004.

At operation 1018, the SGSN/SGW 1004 then requests the GGSN/PGW 1006 create the PDP context. At operation 1020, the GGSN/PGW 1006 asks the VCRE 1008 to assigning a VCRE instance 1012 for the MS 1002. At operation 1022, the VCRE 1008 requests a profile corresponding to the MS 1002 from the RCF 1010, which returns it at operation

1024. At operation 1026, the VCRE 1008 assigns the profile to the VCRE instance 1012. At operation 1028, the GGSN/PGW 1006 creates a PDP response and sends it to the SGSN/SGW 1004, which at operation 1030 activates a PDP response to the MS 1002.

At this stage, GTP traffic can pass from the MS 1002 through the SGSN/SGW 1004 and to the GGSN/PGW 1006. This is represented at operations 1032 and 1034. At operation 1036, the GGSN/PGW 1006 decapsulates the GTP tunnels and passes the IP traffic towards the appropriate VCRE instance 1012. The VCRE instance 1012 enforces the policy on both outgoing 1038 and incoming 1040 traffic.

In actuality the GTP protocol is broken up into a control section, known as GTP-C, and an IP-based tunnelling protocol known as GTP-U, and hence at this stage the IP traffic may actually be formatted according to the GTP-U protocol. Separate tunnels are identified by a tunnel endpoint identifier (TED) in the GTP-U messages, which may be a dynamically allocated random number. If the random number is of cryptographic quality, then it provides a measure of security against certain types of attacks.

Figure 11:
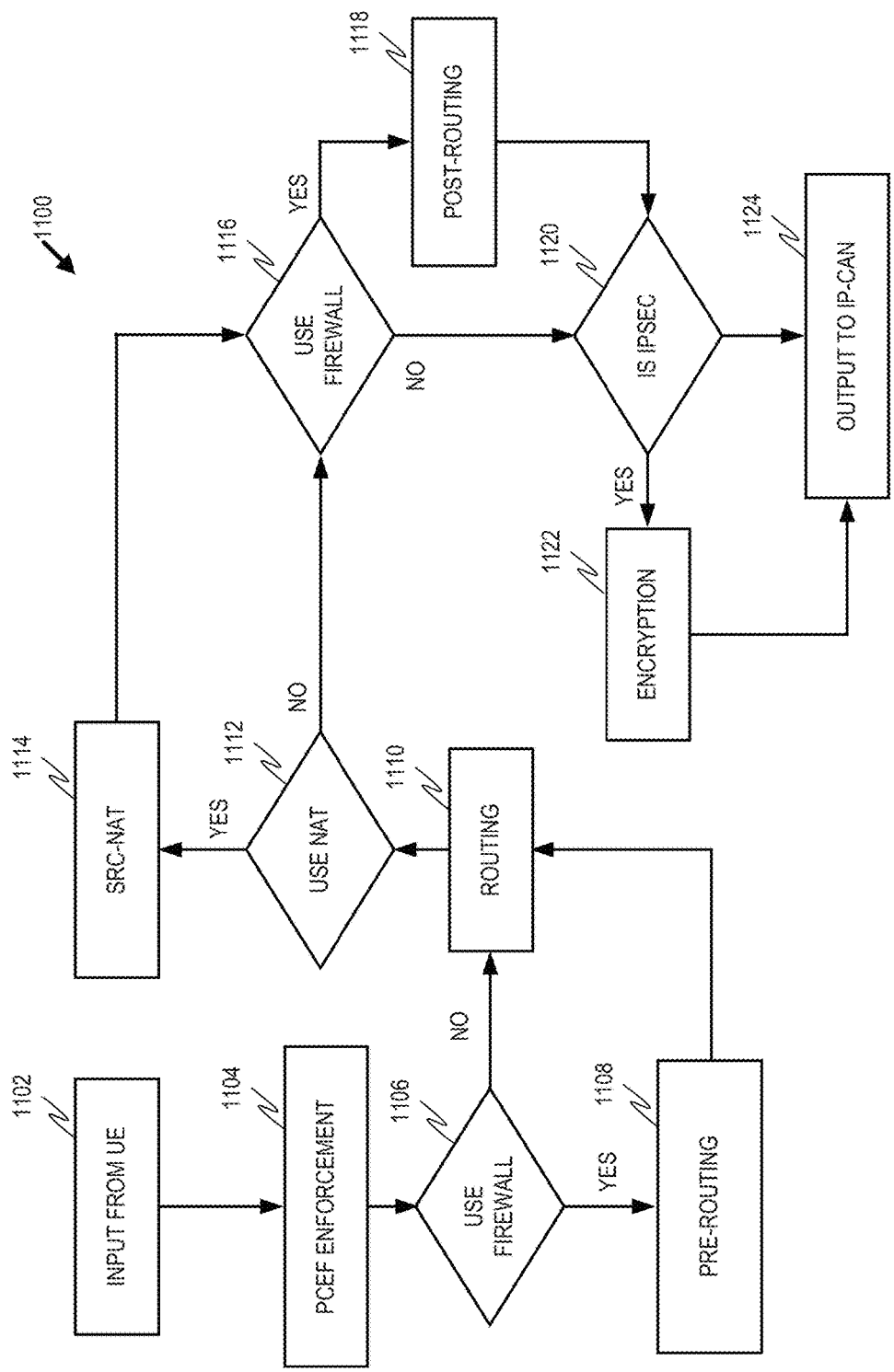
FIG. 11 is a flow diagram illustrating a method, in accordance with an example embodiment, of handling an outgoing data packet from within a mobile network towards an external IP network.

FIG. 11 is a flow diagram illustrating a method 1100, in accordance with an example embodiment, of handling an incoming data packet in a mobile network. This figure represents the handling of an "upstream" packet, namely a packet sent from a mobile device in the mobile network to a packet based network. In an example embodiment, this method 1100 may be performed by A PICNEEC, or the like. At operation 1102, a data packet is received from a mobile device. This data packet may be generated by, for example, an application running on the mobile device. At operation 1104, a Policy and Charging Execution Function (PCEF) performs enforcement on this data packet. This PCEF enforcement includes enforcement of policy decisions such as Quality of Service (QoS) and online and offline charging. At operation 1106, the VCRE decides if the packet is under a firewall rule. This is determined by, for example, examining the policy in the VCRE instance corresponding to the mobile device. If so, then at operation 1108 pre-routing firewall enforcement is performed using the policy. In an example embodiment, the pre-routing firewall enforcement includes marking particular packets. For example, it may be desirable to have regular HTTP traffic be sent via one VPN and HTTP traffic to a specific web site be sent via another VPN. Pre-routing firewall enforcement rules may act to mark the packets in accordance with the rules. At operation 1110, routing is performed. This may include, for example, routing packets in accordance with the way they were marked during pre-routing firewall enforcement. At operation 1112, it is determined if the packet sits behind NAT. This is determined by, for example, examining the policy in the VCRE instance corresponding to the mobile device. If so, then at operation 1114 source SAT (with possible NAT rules) is applied on the packet using the policy.

At operation 1116, it is determined if a firewall applies after the NAT and routing decision. This is determined by, for example, examining the policy in the VCRE instance corresponding to the mobile device. If so, then at operation 1118, post-routing firewall enforcement is performed using the policy. In an example embodiment, post-routing firewall enforcement may include rules that alter packet characteristics, such as packet size and packet headers, after the routing process has been completed. At operation 1120, it is determined if a security policy like IPSEC encryption is used. This is determined by, for example, examining the policy in the VCRE instance corresponding to the mobile device. If so, then at operation 1122, encryption or some other security technique is performed. At operation 1124, the final packet is sent out to the outside packet based network.

Figure 12:
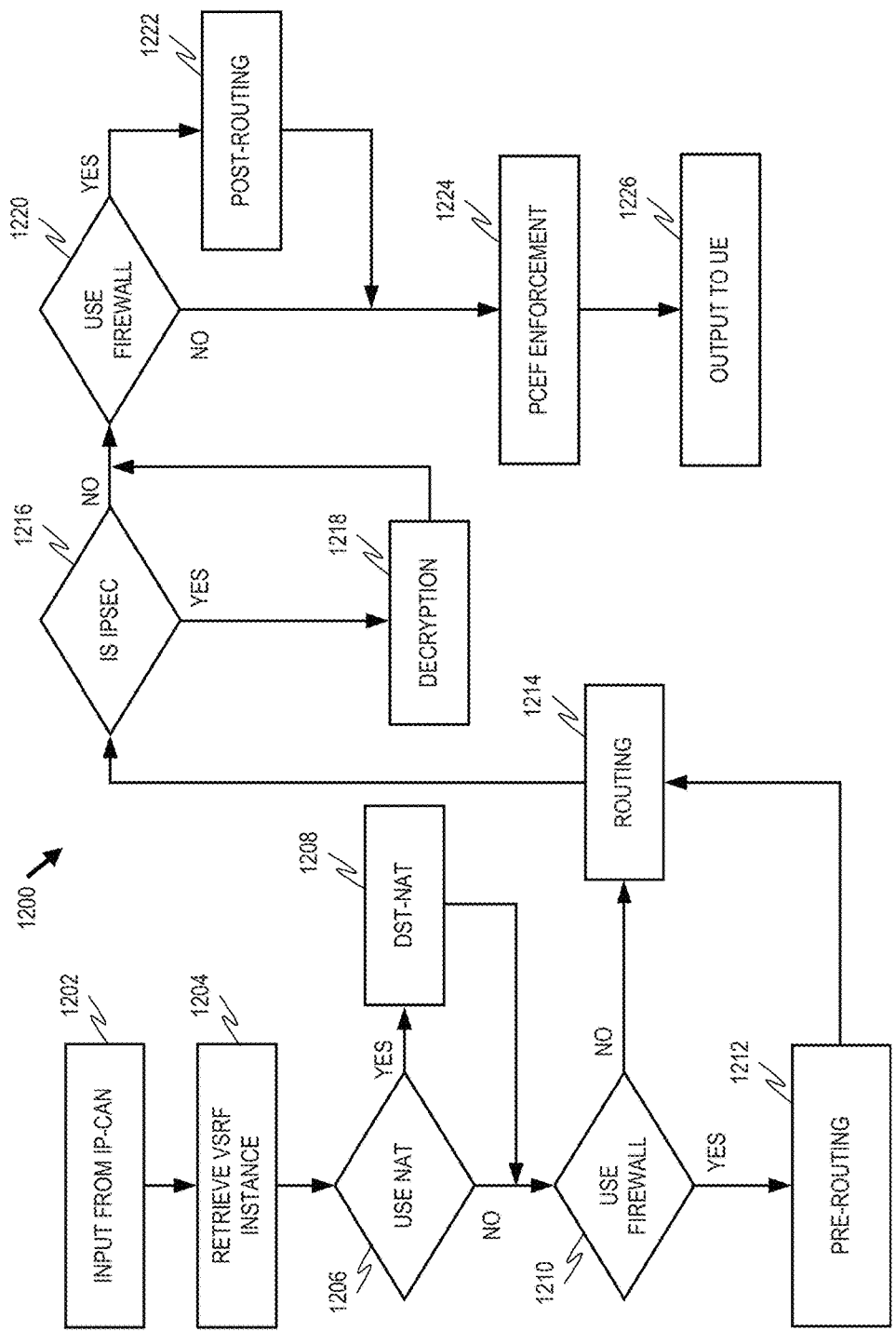
FIG. 12 is a flow diagram illustrating a method, in accordance with another example embodiment, of handling an incoming data packet from an external IP network towards the mobile network.

FIG. 12 is a flow diagram illustrating a method 1200, in accordance with another example embodiment, of handling an incoming data packet in a mobile network. This figure represents the handling of a "downstream" packet, namely a packet sent from a packet based network to a mobile device in the mobile network. In an example embodiment, this method 1200 may be performed by A PICNEEC, or the like. At operation 1202, a data packet is received from a packet based network. At operation 1204, a destination address of the data packet used to retrieve a VCRE instance based on address. For example, the destination address may be an Internet Protocol (IP) address and the VCRE instance may have an IP address, list of IP addresses, or IP address range as a field that may be searched to retrieve the policy.

At operation 1206, it is determined whether the policy indicates that NAT is used for the IP address. If so, then at operation 1208, a NAT policy may be applied to the IP address to maintain a session on the downstream packet based on the NAT-ed IP address.

At operation 1210, it is determined whether a firewall policy is defined for the IP address. If so, then at operation 1212, pre-routing firewall rules may be executed. In an example embodiment, this may include rules to aid in blocking distributed denial of service (DDOS) attacks. Traffic from particular IP addresses may be marked in accordance with the pre-routing firewall rules, as well as added to a blacklist if they exceed a threshold.

At operation 1214, the data packet is routed according to a routing policy. At operation 1216, it is determined if a security policy like IPSEC encryption is used. This is determined by, for example, examining the policy in the VCRE instance corresponding to the IP address. If so, then at operation 1218, decryption or some other security technique is performed.

At operation 1220, it is determined whether a firewall policy is defined for the IP address. If so, then at operation 1222, post-routing firewall rules may be executed. At operation 1224, a PCEF may perform enforcement on the data packet. At operation 1226, the final packet is sent to the user device corresponding to the IP address.

Figure 13:
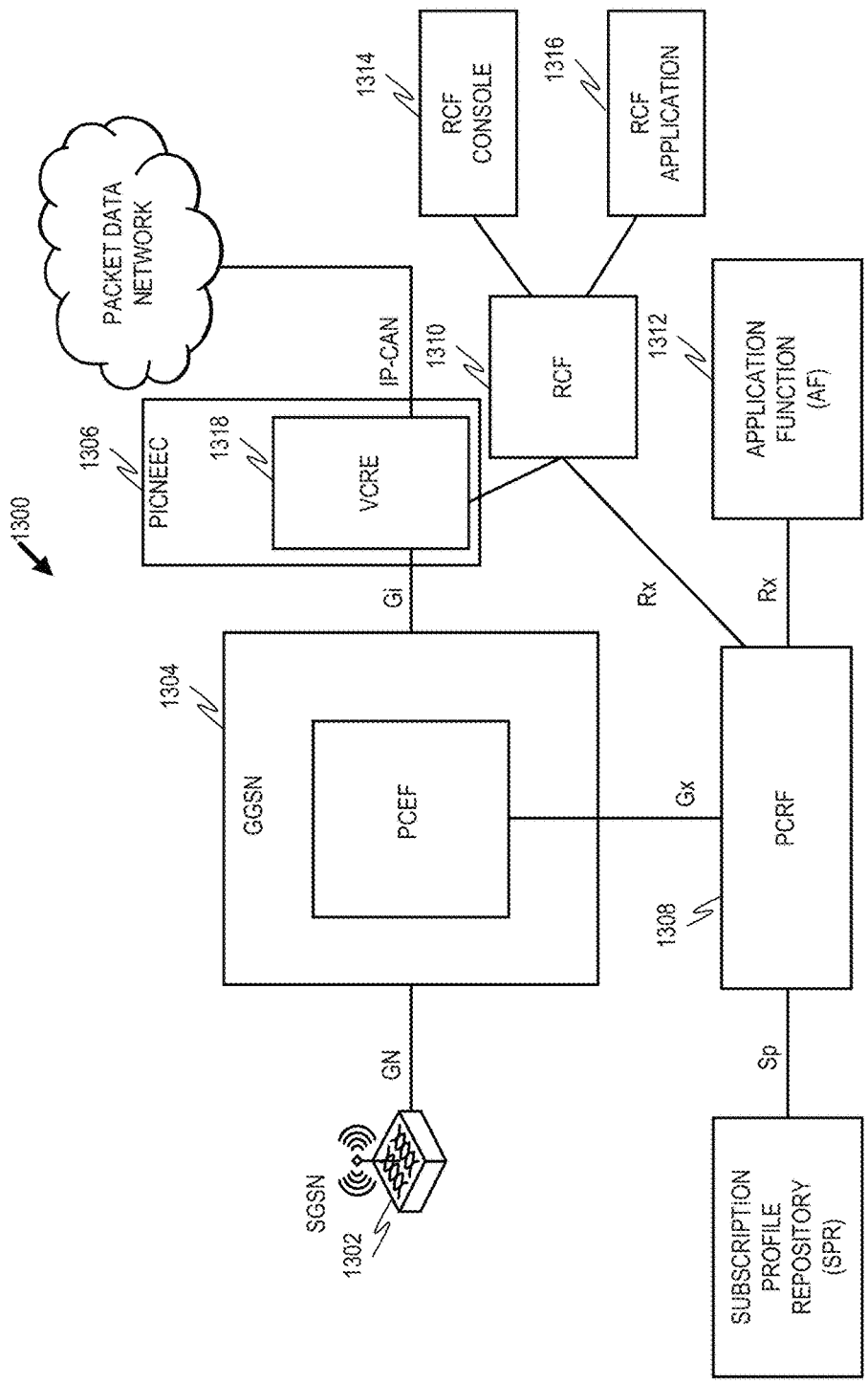
FIG. 13 is a block diagram illustrating a system, in accordance with an example embodiment, including an SGSN/SGW and a standalone GGSN/PGW with an external PICNEEC.

In another example embodiment, a PICNEEC is located externally to the GGSN/PGW. FIG. 13 is a block diagram illustrating a system 1300, in accordance with an example embodiment, including an SGSN/SGW 1302 and an GGSN/PGW 1304. In an example embodiment the SGSN/SGW 1302 may be the SGSN 110 of FIG. 1 and the GGSN/PGW 1304 may be the GGSN 114 of FIG. 1. The SGSN/SGW 1302 transfers data from the mobile radio network to the GGSN/PGW 1304 via a Gn interface port. The GGSN/PGW 1304 communicates via a Gi port to an external PICNEEC 1306, which sits on the Gi reference point. The VCRE 1318 inside the PICNEEC 1306 defines the routing, firewall, VPN, and security features for the system 1300. A Policy and Charging Rules Execution Function (PREF) 1308 executes general policy and charging rules.

A Rules Customizer Function (RCF) 1310 acts as an external repository and control function that transfers all of the policy and security changes and configurations to the VCRE 1318. The RCF 1310 may also connect to the PCRF 1308 using an Rx interface, as if it is an Application Function 1312. A RCF console 1314 is used by a customer to set the firewall and security policies. The RCF console 1314 may be, for example, a web portal, a Secure Shell (SSH) access, a Man-Machine Language (MML) interface, etc.

A RCF application 1316 provides application program interface (API) access to the RCF 1310, from, for example, an external application, application on a mobile device, etc.

It should be noted that while the above description discusses mechanisms for the PICNEEC 1306 to connect to 3G/4G networks, in some example embodiments the PICNEEC 1306 can also simultaneously connect to Low Power Wide Area Networks (LPWAN) such as LoRa and SIGFOX.

Figure 14:
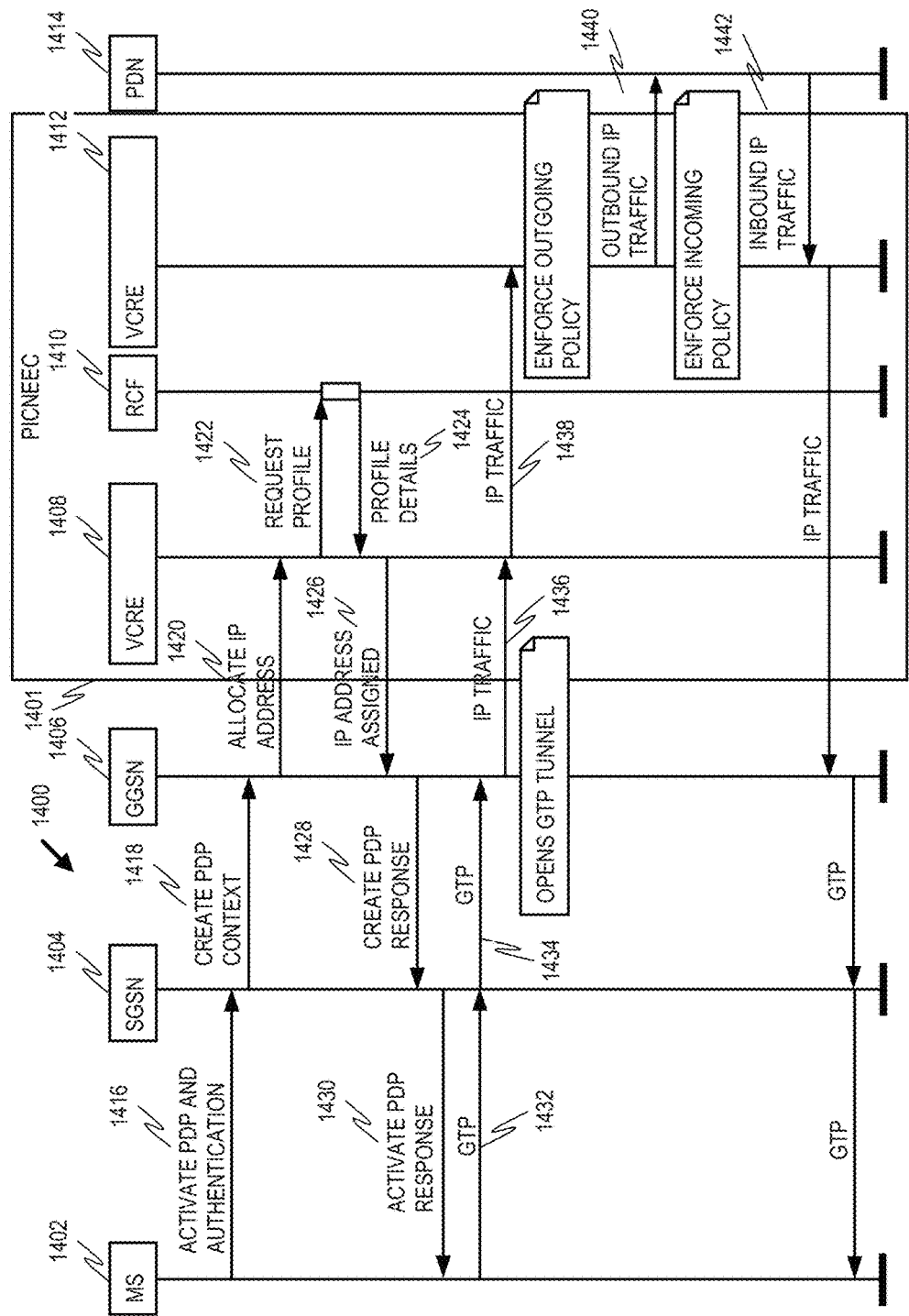
FIG. 14 is an interaction diagram illustrating a method, in accordance with an example embodiment, of handling data packets in a mobile network with an external PICNEEC.

FIG. 14 is an interaction diagram illustrating a method 1400, in accordance with an example embodiment, of handling data packets in a mobile network with an external PICNEEC. The method 1400 may utilize a mobile set (MS) 1402, an SGSN/SGW 1404, an GGSN/PGW 1406, an external PICNEEC 1401 with a VCRE 1408, a RCF 1410, a VCRE instance 1412 connecting to a packet data network (PDN) 1414. The MS 1402 may be the grouping of mobile devices that is the subject of the security and/or firewall rules described herein.

At operation 1416, the MS 1402 tries to register to the network and authenticate itself via the SGSN/SGW 1404. This is called creating a packet data protocol (PDP) context. At operation 1418, the SGSN/SGW 1404 then requests the GGSN/PGW 1406 create the PDP context. At operation 1420, the GGSN/PGW 1406 asks the external PICNEEC 1408 to allocate an IP address for a PDP context. This may be performed using protocols such as DHCP or RADIUS. At operation 1422, the external PICNEEC VCRE 1408 requests a profile corresponding to the MS 1402 from the RCF 1410, which returns it at operation 1424. At operation 1426, the external PICNEEC VCRE 1408 assigns the IP address PDP context and returns it. At operation 1428, the GGSN/PGW 1406 creates a PDP response and sends it to the SGSN/SGW 1404, which at operation 1430 activates a PDP response to the MS 1402.

At this stage, GTP traffic can pass from the MS 1402 through the SGSN/SGW 1404 and to the GGSN/PGW 1406. This is represented at operations 1432 and 1434. At operation 1436, the GGSN/PGW 1406 decapsulates the GTP tunnels and passes the IP traffic towards the external PICNEEC VCRE 1408, which then routes the IP traffic at operation 1438 to the appropriate VCRE instance 1412 based on the source address of the traffic. The VCRE instance 1412 enforces the policy on both outgoing 1440 and incoming 1442 traffic. The result is that IP traffic from the PDN is routed from the VCRE instance 1442 to the external PICNEEC VCRE 1408, which knows based on the source address to route the traffic back to the GGSN/PGW 1406.

In certain instances, a particular device group may contain devices that operates in different cellular networks that possibly use different formats than each other. For example, referring back to FIG. 5, device group 504A may contain one device that operates on a GSM network and another device that operates on a CDMA network. This can happen in instance where, for example, an enterprise allows its employees to use their personal cellular devices for work use, and one employee may have a device compatible with a different network (e.g., from a different cell service provider) than another. Another example would be the usage of Proxy Mobile IP (PMIP) technology which allows IP roaming between network technologies. The net result is that a VCRE instance located on one PICNEEC may not be reachable, at least not directly, from a device that connects to a different PICNEEC. In the case of one device operating on a GSM network and another device operating on a Wi-Fi network, the device operating on the GSM network may have its traffic routed through A PICNEEC while the device operating on the Wi-Fi network may have its traffic routed through a Mobile Access Gateway (MAG). There are several possibilities on how to handle such cases.

In a first example embodiment, the customer simply creates the same rules/policies for the device group on multiple different PICNEECs. This is performed by the customer utilizing a separate RCF console or RCF application for each of the multiple PICNEECs. Of course, this may not be a desirable solution because it forces the customer to perform extra work and also comes with the risk that in repeating the creation of the rules/policies the customer may make a mistake and inadvertently cause the rules/policies in a VCRE instance for the device group on one PICNEEC to be different than the corresponding VCRE instance for the device group on another PICNEEC, and thus cause different rules/policies to be applied to devices that should have identical rules/policies.

Figure 15:
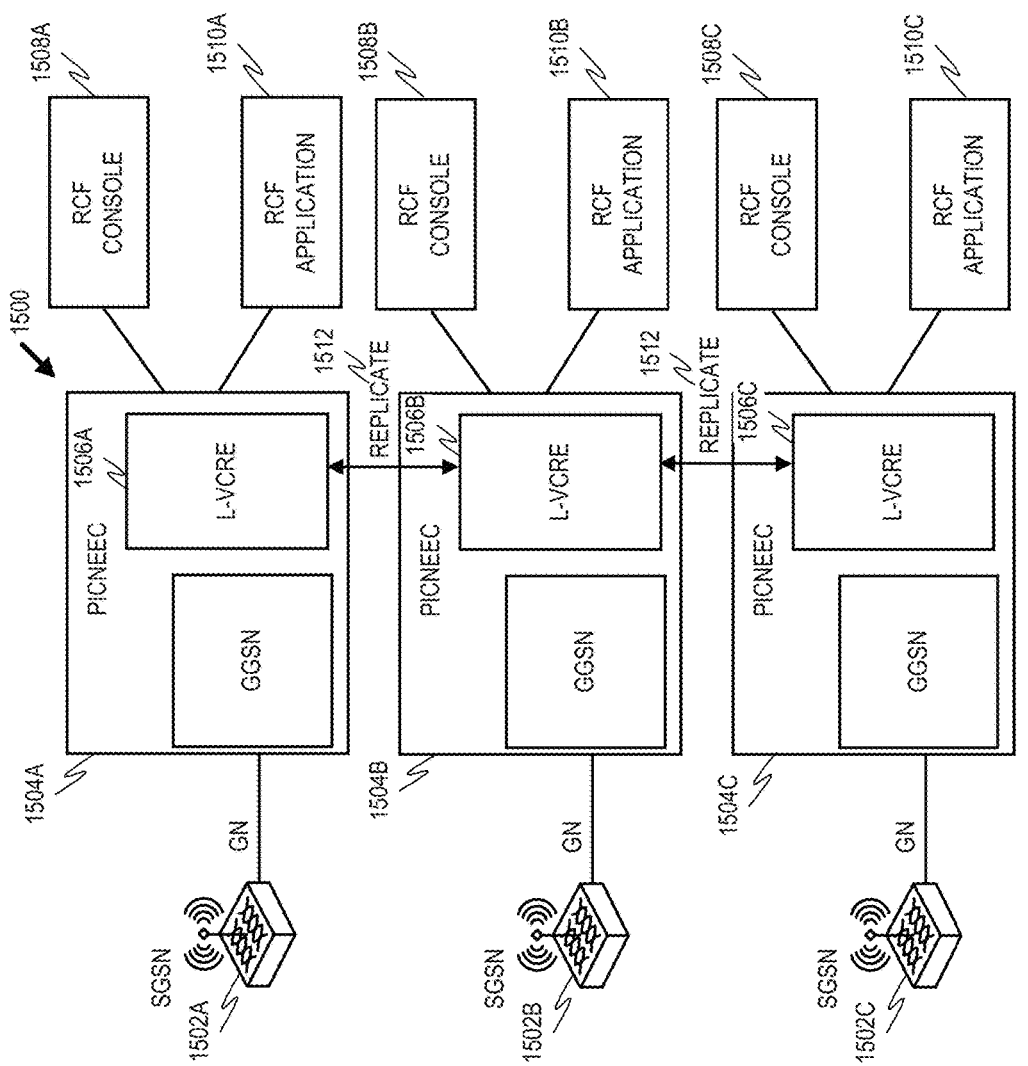
FIG. 15 is a block diagram, in accordance with another example embodiment, illustrating a system including multiple SGSN/SGWs and multiple PICNEECs.

In a second example embodiment, replication is performed at PICNEECs so that when a VCRE instance is created or modified on one PICNEEC the VCRE instance is replicated on the other corresponding PICNEECs. FIG. 15 is a block diagram, in accordance with another example embodiment, illustrating a system 1500 including multiple SGSN/SGWs 1502A, 1502B, 1502C and multiple PICNEECs 1504A, 1504B, 1504C. Each PICNEEC 1504A-1504C may maintain a local VCRE rules function (L-VCRE) 1506A-1506C which manages the VCRE instances assigned to the corresponding PICNEEC 1504A-1504C. A replication service 1512A-1512C on each PICNEEC 1504A-1504C causes the L-VCRE 1506A-1506C to be replicated among the PICNEECs 1504A-1504C, thus maintaining consistent VCRE instances among the PICNEECs 1504A-1504C. Thus, even though a customer may create or modify rules and policies for a device group using one of any number of different RCF consoles 1508A-1508C and RCF applications 1510A-1510C, the VCRE instances are as constant as if the customer repeated the creation or modification of the rules and policies exactly the same way on each of the different RCF consoles 1508A-1508C or RCF applications 1510A-1510C.

Figure 16:
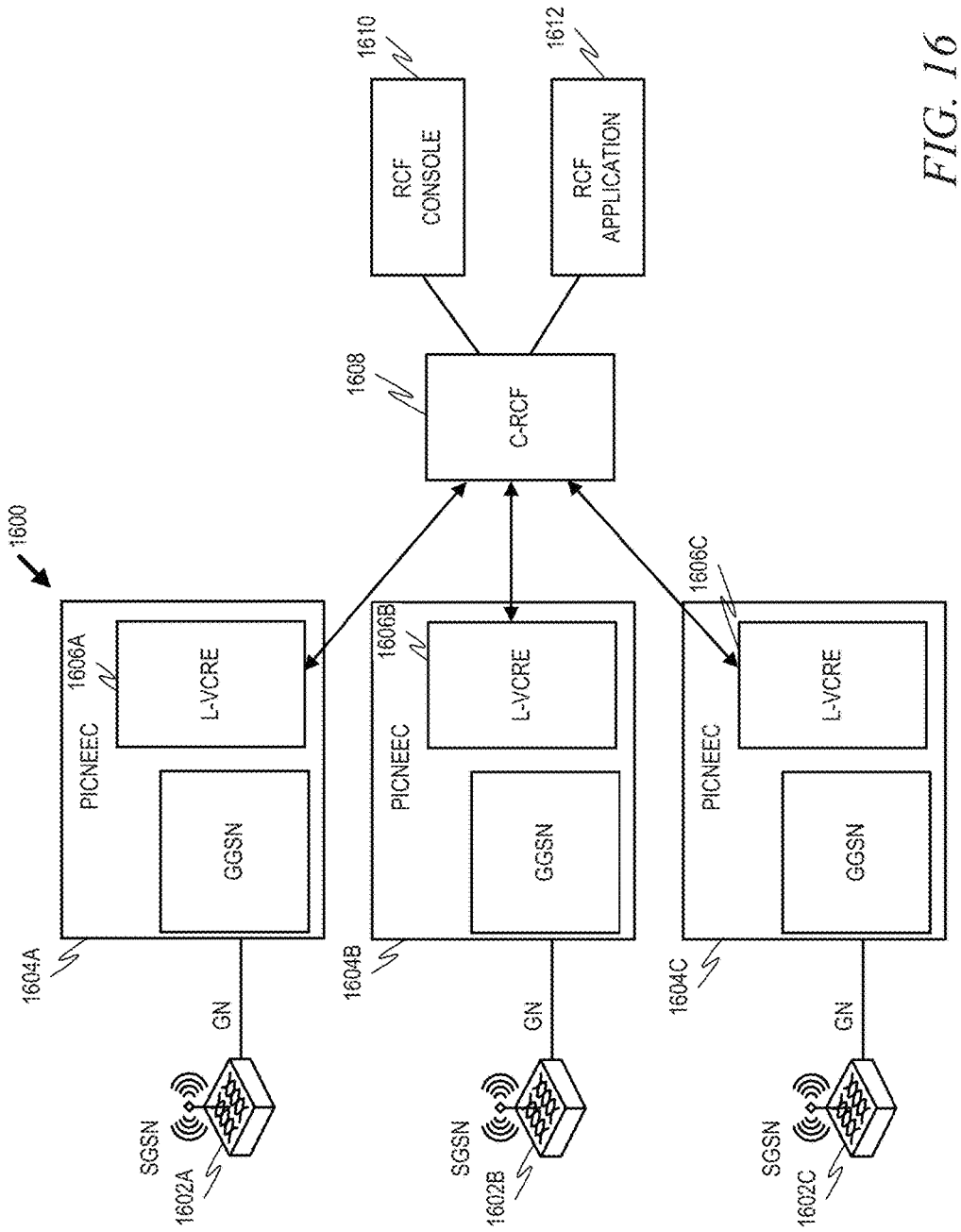
FIG. 16 is a block diagram illustrating a system, in accordance with another example embodiment, including multiple SGSN/SGWs and multiple PICNEECs.

In a third example embodiment, a central Rules Customizer Function (C-RCF) is provided which acts as a single point of interface for the customer to establish or modify rules/policies for a device group, and the C-RCF distributes the rules/policies to multiple local VCRE rules functions. FIG. 16 is a block diagram illustrating a system 1600, in accordance with another example embodiment, including multiple SGSN/SGWs 1602A, 1602B, 1602C and multiple PICNEECs 1604A, 1604B, 1604C. Each PICNEEC 1604A-1604C may maintain a local VCRE rules function (L-VCRE) 1606A-1606C which manages the VCRE instances assigned to the corresponding PICNEEC 1604A-1604C. A central Rules Customizer Function (C-RCF) 1608 acts as a single point of interface for RCF console 1610 and RCF application 1612 and acts to distribute any rules/policies established via the RCF console 1610 and RCF application 1612 to all of the local VCRE rules functions 1606A-1606C, thus establishing consistency among them.

Another possible scenario is that a device switches from one type of network to another, both networks serviced by a single PICNEEC. While this does not require any replication of VCRE instances among multiple PICNEECs, in an example embodiment the PDP context is re-established when the network is changed. Thus, in the event of such an occurrence the PICNEEC may reassign the correct VCRE instance when the PDP context is re-established.

It should be noted that while the above disclosure describes aspects relating to a GGSN and/or PGW, the same techniques and components may be applied to any networking gateway that receives communications transmitted over a mobile radio network. GGSN is an embodiment used primarily in 3G networks while PGW is an embodiment used primarily in 4G networks, but there are other radio technologies, such as CDMA, WIMAX, LoRa and SIGFOX as well as radio technologies not yet created that may utilize a networking gateway in accordance with the instant disclosure.

Figure 17:
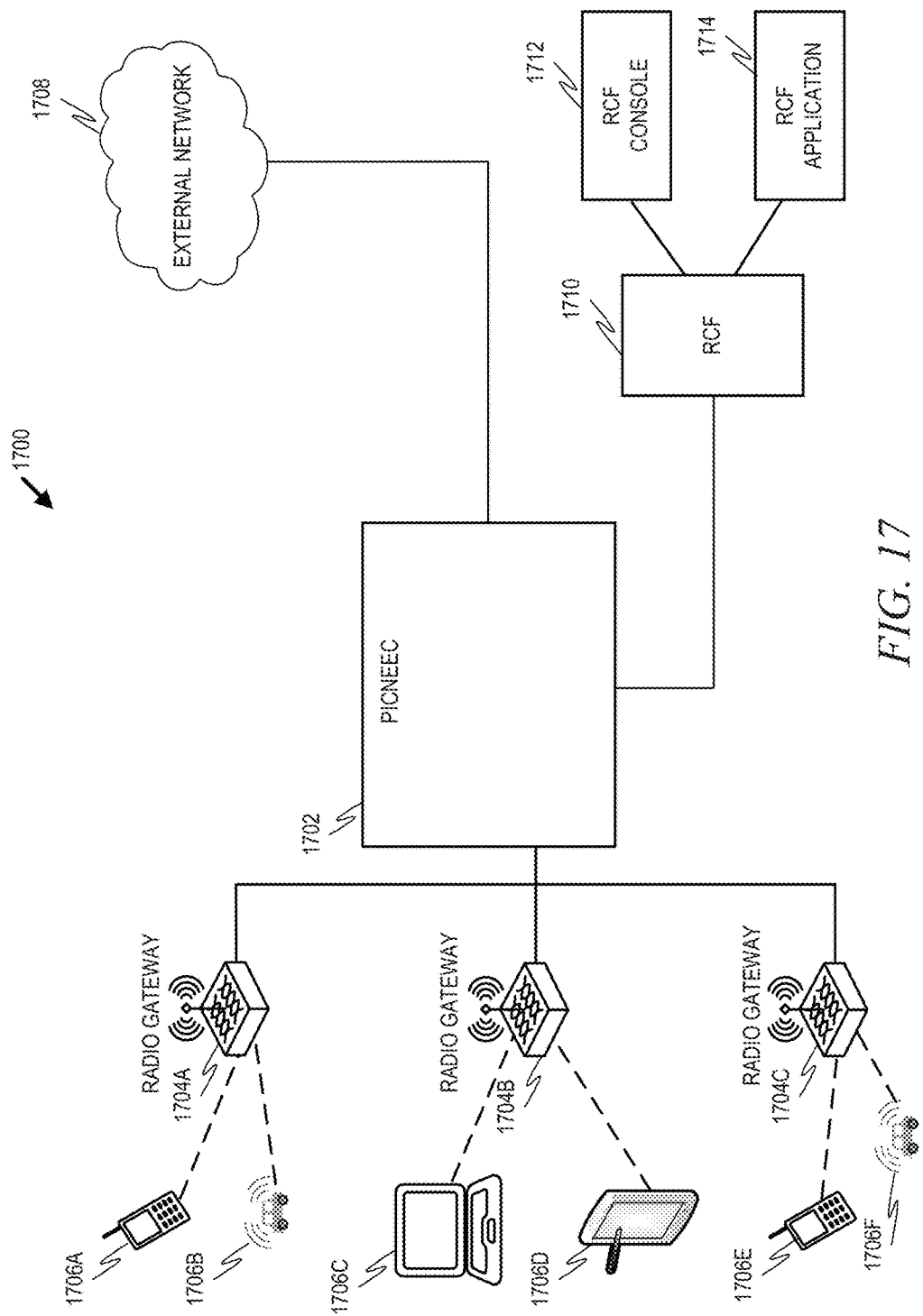
FIG. 17 is a block diagram illustrating a system 1700 including a PICNEEC 1702, in accordance with an example embodiment.

FIG. 17 is a block diagram illustrating a system 1700 including a PICNEEC 1702, in accordance with an example embodiment. The PICNEEC 1702 is compatible with any number of different types of radio gateways 1704A-1704C, which receive and send radio transmissions from and to mobile devices 1706A-1706F. While not pictured, the PICNEEC may include or be in communication with a Virtual Customized Rules Enforcer (VCRE). The VCRE defines the routing, firewall, VPN, and security features for the system 1700, and specifically for communications between the mobile devices 1706A-1706F and the external network 1708.

A Rules Customizer Function (RCF) 1710 is an external repository and control function that transfers all of the policy and security changes and configurations to the VCRE. A RCF console 1712 is used by a customer to set the routing and security policies. The RCF console 1712 may be, for example, a web portal, a Secure Shell (SSH) access, a Man-Machine Language (MML) interface, etc.

An RCF application 1714 provides application program interface (API) access to the RCF, from, for example, an external application, application on a mobile device, etc.

Modules, Components, and Logic

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field-programmable gate array (FPGA) or an application specific integrated circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the processors, not only residing within a single machine, but deployed across a number of machines.

In some example embodiments, the processors or processor-implemented modules may be located in a single geographic location (e.g., within a home environment, an office environment, or a server farm). In other example embodiments, the processors or processor-implemented modules may be distributed across a number of geographic locations.

Machine and Software Architecture

The modules, methods, applications and so forth described in conjunction with FIGS. 1-16 are implemented, in some embodiments, in the context of a machine and an associated software architecture. The sections below describe representative software architecture(s) and machine (e.g., hardware) architecture(s) that are suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "internet of things" while yet another combination produces a server computer for use within a cloud computing architecture. Not all combinations of such software and hardware architectures are presented here as those of skill in the art can readily understand how to implement the inventive subject matter in different contexts from the disclosure contained herein.

Software Architecture

Figure 18:
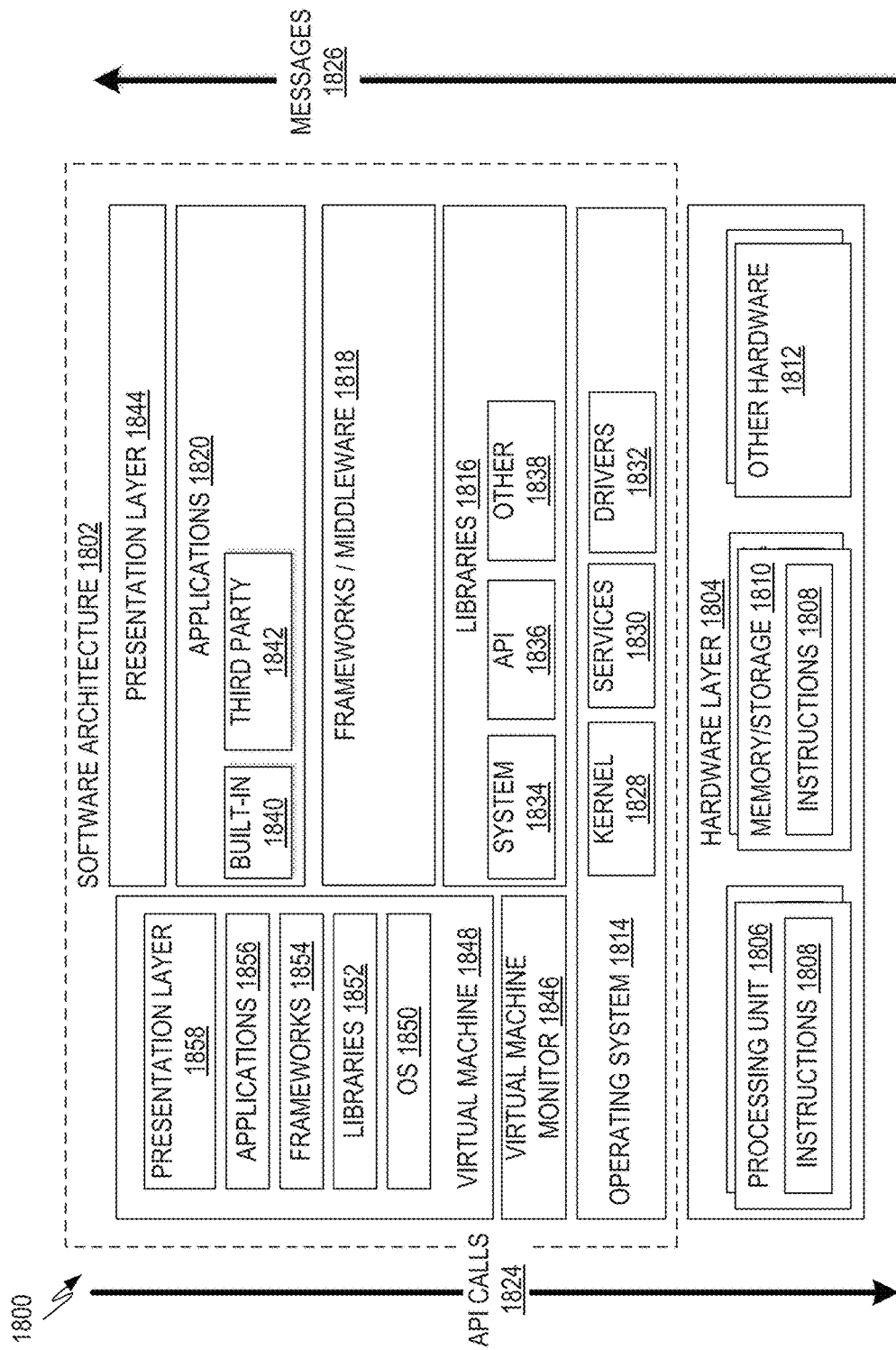
FIG. 18 is a block diagram illustrating a representative software architecture, which may be used in conjunction with various hardware architectures herein described.

FIG. 18 is a block diagram 1800 illustrating a representative software architecture 1802, which may be used in conjunction with various hardware architectures herein described. FIG. 18 is merely a non-limiting example of a software architecture 1802 and it will be appreciated that many other architectures may be implemented to facilitate the functionality described herein. The software architecture 1802 may be executing on hardware such as machine 1900 of FIG. 19 that includes, among other things, processors 1910, memory/storage 1930, and I/O components 1950. A representative hardware layer 1804 is illustrated and can represent, for example, the machine 1900 of FIG. 19. The representative hardware layer 1804 comprises one or more processing units 1806 having associated executable instructions 1808. Executable instructions 1808 represent the executable instructions of the software architecture 1802, including implementation of the methods, modules and so forth of FIGS. 1-16. Hardware layer 1804 also includes memory and/or storage modules 1810, which also have executable instructions 1808. Hardware layer 1804 may also comprise other hardware 1812 which represents any other hardware of the hardware layer 1804, such as the other hardware illustrated as part of machine 1900.

In the example architecture of FIG. 18, the software architecture 1802 may be conceptualized as a stack of layers where each layer provides particular functionality. For example, the software architecture 1802 may include layers such as an operating system 1814, libraries 1816, frameworks/middleware 1818, applications 1820 and presentation layer 1844. Operationally, the applications 1820 and/or other components within the layers may invoke application programming interface (API) calls 1824 through the software stack and receive a response, returned values, and so forth illustrated as messages 1826 in response to the API calls 1824. The layers illustrated are representative in nature and not all software architectures have all layers. For example, some mobile or special purpose operating systems may not provide a frameworks/middleware 1818, while others may provide such a layer. Other software architectures may include additional or different layers.

The operating system 1814 may manage hardware resources and provide common services. The operating system 1814 may include, for example, a kernel 1828, services 1830, and drivers 1832. The kernel 1828 may act as an abstraction layer between the hardware and the other software layers. For example, the kernel 1828 may be responsible for memory management, processor management (e.g., scheduling), component management, networking, security settings, and so on. The services 1830 may provide other common services for the other software layers. The drivers 1832 may be responsible for controlling or interfacing with the underlying hardware. For instance, the drivers 1832 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth, depending on the hardware configuration.

The libraries 1816 may provide a common infrastructure that may be utilized by the applications 1820 and/or other components and/or layers. The libraries 1816 typically provide functionality that allows other software modules to perform tasks in an easier fashion than to interface directly with the underlying operating system 1814 functionality (e.g., kernel 1828, services 1830 and/or drivers 1832). The libraries 1816 may include system libraries 1834 (e.g., C standard library) that may provide functions such as memory allocation functions, string manipulation functions, mathematic functions, and the like. In addition, the libraries 1816 may include API libraries 1836 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 1816 may also include a wide variety of other libraries 1838 to provide many other APIs to the applications 1820 and other software components/modules.

The frameworks/middleware 1818 (also sometimes referred to as middleware) may provide a higher-level common infrastructure that may be utilized by the applications 1820 and/or other software components/modules. For example, the frameworks/middleware 1818 may provide various graphic user interface (GUI) functions, high-level resource management, high-level location services, and so forth. The frameworks/middleware 1818 may provide a broad spectrum of other APIs that may be utilized by the applications 1820 and/or other software components/modules, some of which may be specific to a particular operating system or platform.

The applications 1820 include built-in applications 1840 and/or third-party applications 1842. Examples of representative built-in applications 1840 may include, but are not limited to, a contacts application, a browser application, a book reader application, a location application, a media application, a messaging application, and/or a game application. Third-party applications 1842 may include any of the built-in applications 1840 as well as a broad assortment of other applications. In a specific example, the third-party application 1842 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third-party application 1842 may invoke the API calls 1824 provided by the mobile operating system such as operating system 1814 to facilitate functionality described herein.

The applications 1820 may utilize built-in operating system functions (e.g., kernel 1828, services 1830 and/or drivers 1832), libraries (e.g., system libraries 1834, API libraries 1836, and other libraries 1838), frameworks/middleware 1818 to create user interfaces to interact with users of the system. Alternatively, or additionally, in some systems, interactions with a user may occur through a presentation layer, such as presentation layer 1844. In these systems, the application/module "logic" can be separated from the aspects of the application/module that interact with a user.

Some software architectures utilize virtual machines. In the example of FIG. 18, this is illustrated by virtual machine 1848. A virtual machine creates a software environment where applications/modules can execute as if they were executing on a hardware machine (such as the machine 1900 of FIG. 19, for example). A virtual machine 1848 is hosted by a host operating system (operating system 1814 in FIG. 18) and typically, although not always, has a virtual machine monitor 1846, which manages the operation of the virtual machine 1848 as well as the interface with the host operating system (i.e., operating system 1814). A software architecture executes within the virtual machine 1848 such as an operating system 1850, libraries 1852, frameworks/middleware 1854, applications 1856 and/or presentation layer 1858. These layers of software architecture executing within the virtual machine 1848 can be the same as corresponding layers previously described or may be different.

Example Machine Architecture and Machine-Readable Medium

Figure 19:
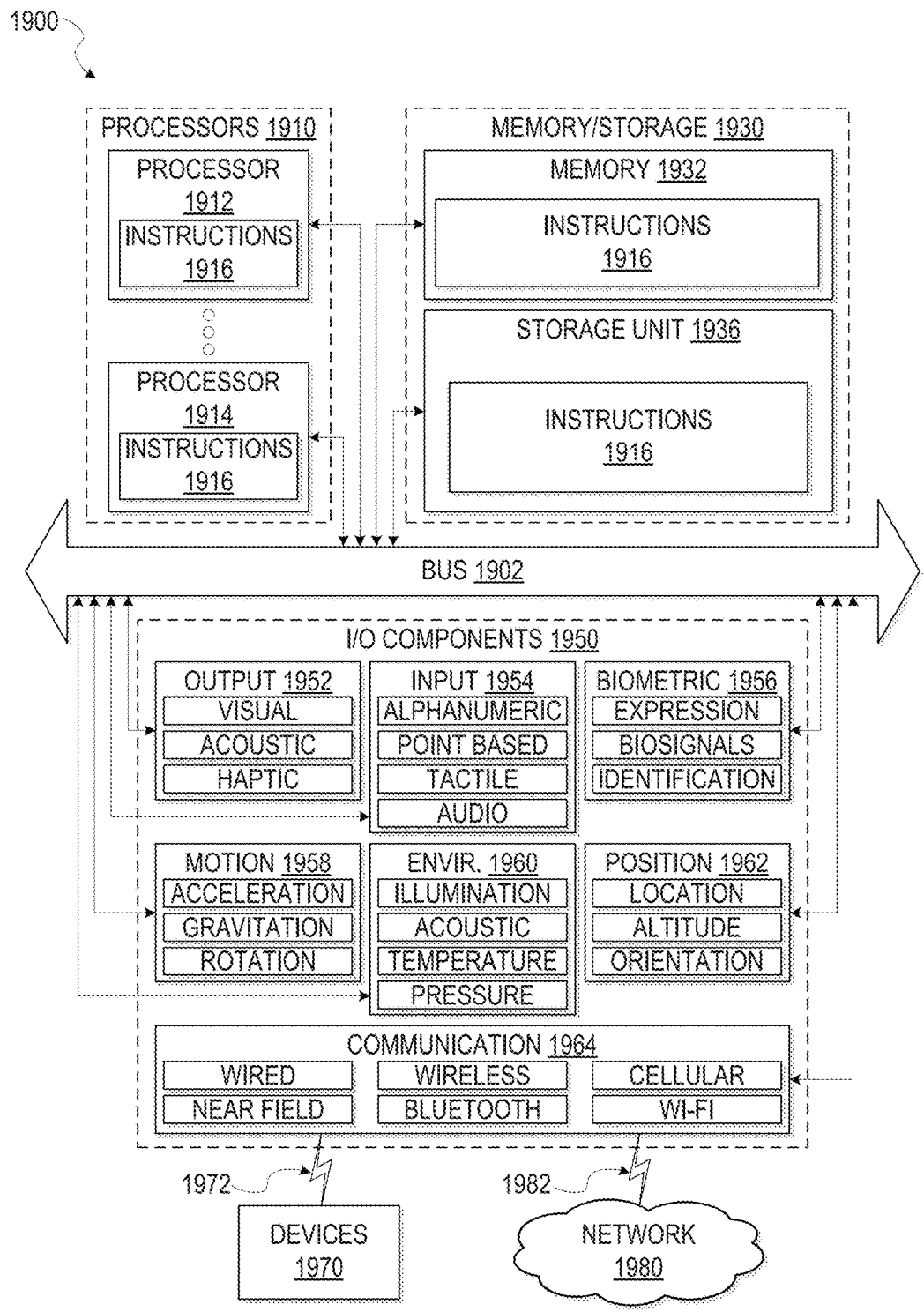
FIG. 19 is a block diagram illustrating components of a machine, according to some example embodiments, able to read instructions from a machine-readable medium (e.g., a machine-readable storage medium) and perform any one or more of the methodologies discussed herein.

FIG. 19 is a block diagram illustrating components of a machine 1900, according to some example embodiments, able to read instructions 1916 from a machine-readable medium (e.g., a machine-readable storage medium) and perform any one or more of the methodologies discussed herein. Specifically, FIG. 19 shows a diagrammatic representation of the machine 1900 in the example form of a computer system, within which instructions 1916 (e.g., software, a program, an application, an applet, an app, or other executable code) for causing the machine 1900 to perform methodologies described above with respect to the endpoints (e.g., mobile devices, device in the external networks) described above. The instructions 1916 transform the general, non-programmed machine 1900 into a particular machine programmed to carry out the described and illustrated functions in the manner described. In alternative embodiments, the machine 1900 operates as a standalone device or may be coupled (e.g., networked) to other machines. In a networked deployment, the machine 1900 may operate in the capacity of a server machine or a client machine in a server-client network environment, or as a peer machine in a peer-to-peer (or distributed) network environment. The machine 1900 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1916, sequentially or otherwise, that specify actions to be taken by machine 1900. Further, while only a single machine 1900 is illustrated, the term "machine" shall also be taken to include a collection of machines 1900 that individually or jointly execute the instructions 1916 to perform any one or more of the methodologies discussed herein.

The machine 1900 may include processors 1910, memory/storage 1930, and I/O components 1950, which may be configured to communicate with each other such as via a bus 1902. In an example embodiment, the processors 1910 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) may include, for example, processor 1912 and processor 1914 that may execute instructions 1916. The term "processor" is intended to include multi-core processor 1912, 1914 that may comprise two or more independent processors 1912, 1914 (sometimes referred to as "cores") that may execute instructions 1916 contemporaneously. Although FIG. 19 shows multiple processors 1910, the machine 1900 may include a single processor 1912, 1914 with a single core, a single processor 1912, 1914 with multiple cores (e.g., a multi-core processor 1912, 1914), multiple processors 1912, 1914 with a single core, multiple processors 1912, 1914 with multiples cores, or any combination thereof.

The memory/storage 1930 may include a memory 1932, such as a main memory, or other memory storage, and a storage unit 1936, both accessible to the processors 1910 such as via the bus 1902. The storage unit 1936 and memory 1932 store the instructions 1916 embodying any one or more of the methodologies or functions described herein. The instructions 1916 may also reside, completely or partially, within the memory 1932, within the storage unit 1936, within at least one of the processors 1910 (e.g., within the processor 1912, 1914's cache memory), or any suitable combination thereof, during execution thereof by the machine 1900. Accordingly, the memory 1932, the storage unit 1936, and the memory of processors 1910 are examples of machine-readable media.

As used herein, "machine-readable medium" means a device able to store instructions 1916 and data temporarily or permanently and may include, but is not limited to, random-access memory (RAM), read-only memory (ROM), buffer memory, flash memory, optical media, magnetic media, cache memory, other types of storage (e.g., erasable programmable read-only memory (EEPROM)) and/or any suitable combination thereof. The term "machine-readable medium" should be taken to include a single medium or multiple media (e.g., a centralized or distributed database, or associated caches and servers) able to store instructions 1916. The term "machine-readable medium" shall also be taken to include any medium, or combination of multiple media, that is capable of storing instructions (e.g., instructions 1916) for execution by a machine (e.g., machine 1900), such that the instructions 1916, when executed by one or more processors of the machine 1900 (e.g., processors 1910), cause the machine 1900 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 1950 may include a wide variety of components to receive input, provide output, produce output, transmit information, exchange information, capture measurements, and so on. The specific I/O components 1950 that are included in a particular machine will depend on the type of machine 1900. For example, portable machines such as mobile phones will likely include a touch input device or other such input mechanisms, while a headless server machine will likely not include such a touch input device. It will be appreciated that the I/O components 1950 may include many other components that are not shown in FIG. 19. The I/O components 1950 are grouped according to functionality merely for simplifying the following discussion and the grouping is in no way limiting. In various example embodiments, the I/O components 1950 may include output components 1952 and input components 1954. The output components 1952 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1954 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1950 may include biometric components 1956, motion components 1958, environmental components 1960, or position components 1962 among a wide array of other components. For example, the biometric components 1956 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1958 may include acceleration sensor components (e.g., accelerometer), gravitation sensor components, rotation sensor components (e.g., gyroscope), and so forth. The environmental components 1960 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1962 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1950 may include communication components 1964 operable to couple the machine 1900 to a network 1980 or devices 1970 via coupling 1982 and coupling 1972 respectively. For example, the communication components 1964 may include a network interface component or other suitable device to interface with the network 1980. In further examples, communication components 1964 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 1970 may be another machine or any of a wide variety of peripheral devices (e.g., a peripheral device coupled via a Universal Serial Bus (USB)).

Moreover, the communication components 1964 may detect identifiers or include components operable to detect identifiers. For example, the communication components 1964 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1964, such as location via Internet Protocol (IP) geo-location, location via Wi-Fi® signal triangulation, location via detecting a NFC beacon signal that may indicate a particular location, and so forth.

Transmission Medium

In various example embodiments, one or more portions of the network 1980 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 1980 or a portion of the network 1980 may include a wireless or cellular network and the coupling 1982 may be a Code Division Multiple Access (CDMA) connection, a Global System for Mobile communications (GSM) connection, or other type of cellular or wireless coupling. In this example, the coupling 1982 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 1916 may be transmitted or received over the network 1980 using a transmission medium via a network interface device (e.g., a network interface component included in the communication components 1964) and utilizing any one of a number of well-known transfer protocols (e.g., hypertext transfer protocol (HTTP)). Similarly, the instructions 1916 may be transmitted or received using a transmission medium via the coupling 1972 (e.g., a peer-to-peer coupling) to devices 1970. The term "transmission medium" shall be taken to include any intangible medium that is capable of storing, encoding, or carrying instructions 1916 for execution by the machine 1900, and includes digital or analog communications signals or other intangible medium to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A PDN Integrated Customized Network Edge Enabler and Controller (PICNEEC), executable by one or more hardware processors, for operation by a mobile network provider, comprising:
   a memory; and
   at least one Virtual Customized Rules Enforcer (VCRE) instance, each VCRE instance corresponding to a group of mobile devices and defining a set of policies personalized for the group of mobile devices, each VCRE instance configured to, upon receiving a data packet communicated between a packet-based network and a mobile device in the corresponding group via a radio network, the radio network being a cellular-based network, execute one or more policy rules stored in the VCRE instance to the data packet prior to forwarding the data packet, each VCRE instance controlled independently of one another via direct accessing of the VCRE instance by a different customer of the mobile network provider, wherein the one or more policy rules include a rule used to establish a virtual private network (VPN) between the VCRE instance and an external network.

2. The PICNEEC of claim 1, wherein the data packet is routed between a Serving General Packet Radio Service (GPRS) Support Node/Serving (SGSN) and a Gateway GPRS Support Node (GGSN) internal to the PICNEEC.

3. The PICNEEC of claim 1, wherein the data packet is routed between a Serving Gateway (SGW) and a Packet Data Network Gateway (PGW) internal to the PICNEEC.

4. The PICNEEC of claim 1, wherein the data packet is routed between a Serving General Packet Radio Service (GPRS) Support Node/Serving (SGSN) and a Gateway GPRS Support Node (GGSN) external to the PICNEEC, the external GGSN handling data for an Internet Protocol (IP) connectivity access network through the PICNEEC.

5. The PICNEEC of claim 1, wherein the data packet is routed between a Serving Gateway (SGW) and a PGW external to the PICNEEC, the external PGW handling data for an IP connectivity access network through the PICNEEC.

6. The PICNEEC of claim 1, wherein the data packet is routed through a mobile network serving packet gateway that handles the data packet through the PICNEEC.

7. The PICNEEC of claim 1, wherein at least one VCRE instance defines customized access point names (APNs).

8. The PICNEEC of claim 1, wherein at least one VCRE instance is an independent virtual network function.

9. The PICNEEC of claim 1, wherein at least one VCRE instance is an independent physical network function.

10. The PICNEEC of claim 1, wherein at least one VCRE instance is a subset of rules in a larger network function, wherein the customer can only access the specific subset of rules.

11. The PICNEEC of claim 1, wherein at least one VCRE instance is created by a customer using a VCRE rules function (RCF) console.

12. The PICNEEC of claim 10, wherein the RCF console is a Secure Shell (SSH) access.

13. The PICNEEC of claim 1, wherein at least one VCRE instance is created by a customer using a VCRE rules function (RCF) application.

14. The PICNEEC of claim 13, wherein the RCF application is an application program interface (API).

15. The PICNEEC of claim 13, wherein the RCF application is a website.

16. The PICNEEC of claim 13, wherein the RCF application is a dedicated computer program.

17. The PICNEEC of claim 11, wherein the RCF console manages at least one VCRE instance directly.

18. The PICNEEC of claim 13, wherein the RCF application manages at least VCRE instance directly.

19. The PICNEEC of claim 11, wherein the RCF console connects to a central RCF that manages at least one of the VCRE instances.

20. The PICNEEC of claim 13, wherein the RCF application connects to a central RCF that manages at least one of the VCRE instances.

21. The PICNEEC of claim 1, wherein a customer defines a corresponding VCRE instance by defining a virtual private network (VPN) between the corresponding VCRE instance and an external network.

22. The PICNEEC of claim 1, wherein a customer defines the corresponding VCRE instance by defining network routing between the corresponding VCRE instance and IP connectivity networks.

23. The PICNEEC of claim 1, wherein a customer defines the corresponding VCRE instance by defining firewall rules for packet data traffic passing through the corresponding VCRE instance.

24. The PICNEEC of claim 1, wherein a customer defines the corresponding VCRE instance by defining network address translation (NAT) rules for packet data traffic passing through the corresponding VCRE instance.

25. The PICNEEC of claim 1, wherein a customer defines the corresponding VCRE instance by defining domain name system (DNS) settings for packet data traffic passing through the corresponding VCRE instance.

26. The PICNEEC of claim 1, wherein a customer defines the corresponding VCRE instance by defining security rules for packet data traffic passing through the corresponding VCRE instance.

27. The PICNEEC of claim 1, wherein a customer defines the corresponding VCRE instance by assigning IP addresses to mobile devices.

28. The PICNEEC of claim 1, wherein a customer defines the corresponding VCRE instance by defining Hypertext Transfer Protocol Header Enrichment (HHE) rules for traffic passing through the corresponding VCRE instance.

29. A method comprising:
receiving, at a PICNEEC executable by one or more hardware processors, a data packet sent between a mobile device and a packet-based network via a radio network, the radio network being a cellular-based network;
determining, based on information in the data packet, a VCRE instance assigned to the mobile device, the VCRE instance controlled independent of other VCRE instances at the PICNEEC via direct accessing of the VCRE instance by a customer of a mobile network provider operating the PICNEEC;
executing one or more policy rules defined in the VCRE instance on the data packet, wherein the one or more policy rules include a rule managing a routing table for routing between the VCRE instance and Internet Protocol (IP) connectivity networks and a rule used to establish a virtual private network (VPN) between the VCRE instance and an external network; and
routing the data packet based on the routing table.

30. The PICNEEC of claim 29, wherein the data packet is routed between a Serving General Packet Radio Service (GPRS) Support Node/Serving (SGSN) and a Gateway GPRS Support Node (GGSN) internal to the PICNEEC.

31. The PICNEEC of claim 29, wherein the data packet is routed between a Serving Gateway (SGW) and a PGW internal to the PICNEEC.

32. The PICNEEC of claim 29, wherein the data packet is routed between a Serving General Packet Radio Service (GPRS) Support Node/Serving (SGSN) and a Gateway GPRS Support Node (GGSN) external to the PICNEEC, the external GGSN handling data for an Internet Protocol (IP) connectivity access network through the PICNEEC.

33. The PICNEEC of claim 29, wherein the data packet is routed between a Serving Gateway (SGW) and a PGW external to the PICNEEC, the external PGW handling data for an IP connectivity access network through the PICNEEC.

34. The PICNEEC of claim 29, wherein the data packet is routed through a mobile network serving packet gateway that handles the data packet through the PICNEEC.

35. A PDN Integrated Customized Network Edge Enabler and Controller (PICNEEC), executable by one or more hardware processors, for operation by a mobile network provider, comprising:
at least one Virtual Customized Rules Enforcer (VCRE) instance, each VCRE instance corresponding to a group of mobile devices and defining a set of policies personalized for the group of mobile devices, each VCRE instance configured to, upon receiving a data packet communicated between a packet-based network and a mobile device in the corresponding group via a radio network, the radio network being a cellular-based network, execute one or more policy rules stored in the VCRE instance to the data packet prior to forwarding the data packet, each VCRE instance controlled independently of one another via direct accessing of the VCRE instance by a different customer of the mobile network provider, wherein the one or more policy rules include a rule used to establish a virtual private network (VPN) between the VCRE instance and an external network;
wherein the PICNEEC is simultaneously connected to a 3G/4G network and a Low Power Wide Area Network (LPWAN).

* * * * *